(12) United States Patent
Sugimoto et al.

(10) Patent No.: US 8,281,892 B2
(45) Date of Patent: Oct. 9, 2012

(54) WORKING VEHICLE AND HST UNIT

(75) Inventors: Hiroshi Sugimoto, Hyogo (JP); Hideki Kanenobu, Hyogo (JP); Koji Iwaki, Hyogo (JP); Kenta Sashikuma, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 678 days.

(21) Appl. No.: 12/408,098

(22) Filed: Mar. 20, 2009

(65) Prior Publication Data
US 2009/0236169 A1 Sep. 24, 2009

(30) Foreign Application Priority Data

Mar. 21, 2008 (JP) ................................. 2008-074323

(51) Int. Cl.
*B60K 17/356* (2006.01)
(52) U.S. Cl. .......................... 180/307; 180/371; 475/200
(58) Field of Classification Search .................. 475/200, 475/203, 204, 205, 221; 180/371, 372, 307
See application file for complete search history.

(56) References Cited

U.S. PATENT DOCUMENTS

| | | | | |
|---|---|---|---|---|
| 250,955 | A * | 12/1881 | Ogden | 475/244 |
| 4,627,237 | A * | 12/1986 | Hutson | 60/487 |
| 6,993,906 | B1 * | 2/2006 | Smothers et al. | 60/487 |
| 2004/0035105 | A1 * | 2/2004 | Sakikawa | 60/487 |
| 2006/0260303 | A1 * | 11/2006 | Ishii et al. | 60/487 |
| 2006/0272878 | A1 * | 12/2006 | Ohashi et al. | 180/305 |
| 2006/0278459 | A1 * | 12/2006 | Iwaki et al. | 180/242 |
| 2007/0044466 | A1 * | 3/2007 | Abend et al. | 60/487 |

FOREIGN PATENT DOCUMENTS

| | | |
|---|---|---|
| EP | 0 532 068 A1 | 3/1993 |
| JP | 63-196916 | 12/1988 |
| JP | 9-51709 | 2/1997 |
| JP | 2005-218315 | 8/2005 |

OTHER PUBLICATIONS

Partial European Search Report for European Application No. EP 09 15 5476, European Patent Office, search completed: May 19, 2009, 7 pgs.

* cited by examiner

*Primary Examiner* — Hau Phan
*Assistant Examiner* — Bryan Evans
(74) *Attorney, Agent, or Firm* — Sterne, Kessler, Goldstein & Fox P.L.L.C.

(57) ABSTRACT

The working vehicle includes an axle unit that has a differential gear device, an axle case, an axle input shaft and first and second main output shafts, and an HST unit that has a hydraulic pump main body, a hydraulic motor main body, a capacity adjustment mechanism, an HST case, a pump shaft and a motor shaft, an HST input shaft, and an HST output shaft, wherein the axle unit is directly or indirectly supported by the vehicle frame so as to be positioned close to a first main driving wheel in a state where the axle input shaft extends in a vehicle widthwise direction, wherein the HST unit is directly or indirectly supported by the vehicle frame at a position away from the axle unit in a state where the HST output shaft extends in the vehicle widthwise direction, and wherein the HST output shaft and the axle input shaft are operatively connected to each other through an endless type transmission member.

14 Claims, 24 Drawing Sheets

WORKING VEHICLE AND HST UNIT

BACKGROUND OF THE INVENTION

1. Field of the Invention

The present invention relates to a working vehicle configured so that rotational power whose speed has been changed in a non-stepwise manner by an HST is differentially transmitted to a pair of first and second driving wheels on left and right sides through a differential gear device.

Further, the present invention relates to an HST unit including a hydraulic pump main body and a hydraulic motor main body.

2. Background Art

A travel-system transmission structure configured so that rotational power whose speed has been changed in a non-stepwise manner by an HST is differentially transmitted to a pair of main driving wheels through a differential gear device has been proposed and used in a working vehicle such as a tractor (refer to, for example, U.S. Pat. No. 6,993,906).

However, the travel-system transmission structure described in the patent document has a problem of difficulty in providing a free space between the pair of main driving wheels.

Specifically, in the travel-system transmission structure described in the patent document, the differential gear device is accommodated in an axle case for accommodating a pair of left and right driving axles at a substantially-center portion in a vehicle widthwise direction and, further, a casing of the HST is integrated with the axle case at a substantially-center portion in the vehicle widthwise direction.

Accordingly, it is impossible to provide a free space between the pair of main driving wheels and, for example, in a case where a discharge duct is provided between the pair of main driving wheels, it is necessary to form the discharge duct to have a complicated shape, in order to prevent the discharge duct from interfering with the HST and the portion of the axle case which accommodates the differential gear device.

Further, an HST unit capable of changing in a non-stepwise manner a speed of rotational power from a driving power source and outputting the same has been widely used in a travel-system transmission path in a working vehicle such as a tractor.

More specifically, the HST unit includes a pump shaft operatively coupled to a driving power source, a hydraulic pump main body which is supported by the pump shaft in a relatively non-rotatable manner with respect thereto, a hydraulic motor main body which is fluidly connected to the hydraulic pump main body through a pair of HST lines, a motor shaft which supports the hydraulic motor main body in a relatively non-rotatable manner with respect thereto, a capacity adjustment mechanism which changes the capacity of at least one of the hydraulic pump main body and the hydraulic motor main body, and an HST case which accommodates the hydraulic pump main body, the hydraulic motor main body and the capacity adjustment mechanism in a liquid tight manner. Further, the HST unit is structured to be capable of outputting rotational power directly or indirectly from the motor shaft.

By the way, the working vehicle includes a two-wheel hydraulic drive type configured so that a single or a pair of wheels which are placed on a side opposite from a pair of main driving wheels in a vehicle lengthwise direction functions as a non-driving wheel, and a four-wheel hydraulic drive types configured so that the wheels which on the side opposite from the pair of main driving wheels in the vehicle lengthwise direction are driven by a sub hydraulic motor main body separate from the hydraulic motor main body of the HST unit.

However, the conventional HST unit is merely structured to be capable of outputting rotational power directly or indirectly from the motor shaft and, therefore, can be applied to only a working vehicle of the two-wheel hydraulic drive type.

Accordingly, in a case where the conventional HST unit is applied to working vehicle of the four-wheel hydraulic drive type, there is a need for providing an additional hydraulic pump main body for hydraulically driving the sub hydraulic motor main body.

BRIEF SUMMARY OF THE INVENTION

In view of the prior art, it is a first object of the present invention to provide a working vehicle including an HST that changes speed of rotational power in a non-stepwise manner and a differential gear device that outputs rotational power from the HST to a pair of left and right main driving wheels in a differential manner to each other, the working vehicle capable of securing a free space as large as possible between the pair of main driving wheels.

Further, it is a second object of the present invention to provide an HST capable of directly or indirectly outputting rotational power of a hydraulic motor main body trough a motor shaft for operatively driving a main driving wheel, the HST unit capable of being applied to a hydraulic four-wheel-drive structure in which the main driving wheel is operatively driven by the hydraulic motor main body and a sub driving wheel separate from the main driving wheel is operatively driven by a sub hydraulic motor main body, in addition to a hydraulic two-wheel-drive structure in which only the main driving wheel is operatively driven by the hydraulic motor main body.

In order to achieve the first object, the present invention provides a working vehicle including a vehicle frame, a driving power source supported by the vehicle frame, a pair of left and right first and second main driving wheels positioned on one side in a vehicle lengthwise direction, an HST formed by a hydraulic pump main body which is operatively driven by the driving power source and a hydraulic motor main body which is fluidly connected to the hydraulic pump main body through a pair of first and second HST lines, and a differential gear device differentially outputting rotational power from the HST to the pair of main driving wheels, wherein there is provided an axle unit including the differential gear device, an axle case that accommodates the differential gear device, an axle input shaft that is supported by the axle case in a state where its first end extends outward from the axle case so as to input rotational power from the HST, and first and second main output shafts that are differentially driven to each other by the differential gear device and output rotational power toward the first and second main driving wheels, wherein there is provided an HST unit including the hydraulic pump main body, the hydraulic motor main body, a capacity adjustment mechanism that changes a capacity of at least one of the hydraulic pump main body and the hydraulic motor main body, an HST case that accommodates the hydraulic pump main body, the hydraulic motor main body and the capacity adjustment mechanism in a liquid tight manner, a pump shaft and a motor shaft that support the hydraulic pump main body and the hydraulic motor main body, respectively, in a relatively non-rotatable manner with respect thereto, an HST input shaft that is supported by the HST case in a state capable of being operatively coupled to the driving power source, and an HST output shaft that is supported by the HST case in a state where at least its first end is extended outward from the HST case so as to output rotational power of the hydraulic motor main body to the outside, wherein the axle unit is directly or indirectly supported by the vehicle frame so as to be positioned close to the first main driving wheel in a state where the axle input shaft extends in a vehicle widthwise direction, wherein the HST unit is directly or indirectly supported by the vehicle frame at a position away from the axle unit in a state where the HST output shaft extends in the vehicle widthwise direction, and wherein the HST output shaft and the axle input shaft are operatively connected to each other through an endless type transmission member.

The working vehicle according to the present invention makes it possible to secure the free space as large as possible between the first and second main driving wheels.

Preferably, the working vehicle may include a brake mechanism capable of selectively applying a braking force to a traveling system power transmission path extending from the driving power source to the pair of main driving wheels. The brake mechanism is provided at the HST unit so as to operatively apply the braking force to the motor shaft.

Preferably, the pump shaft has a first end that is extended outward from the HST case so that the pump shaft functions as the HST input shaft and a second end on an opposite from the first end that is also extended outward from the HST case. The HST unit is mounted at the working vehicle so that the pump shaft extends in a vertical direction. On the second end of the pump shaft, a cooling fan is supported in a relatively non-rotatable manner with respect thereto.

In any one of the above configurations, the HST unit may include an auxiliary pump main body rotated and driven by the pump shaft with using fluid stored in the HST case as a fluid source, and a filter that filters fluid of the stored fluid that is suctioned by the auxiliary pump main body. The filter is accommodated in the HST case in such a manner that at least a part thereof is positioned in a lower region of the internal space of the HST case.

In any one of the above configurations, the HST unit may further include a reservoir tank fluidly connected to the internal space of the HST case through a communication port provided in the HST case. The communication port opens, to the outside, a portion of the internal space of the HST case that is positioned uppermost in a state where the HST unit is mounted at the working vehicle. The reservoir tank is placed so that its storage space is positioned above the internal space of the HST case.

In any one of the above configurations, the HST unit may further include a speed-reduction gear train that transmits rotational power of the motor shaft to the HST output shaft with reducing rotational speed thereof.

In any one of the above configurations, the differential gear device may include a ring gear operatively coupled to the axle input shaft, first and second side bevel gears supported by the first and second output shafts, respectively, in a relatively non-rotatable manner with respect thereto, a pinion shaft rotating together with the ring gear, and a bevel pinion supported by the pinion shaft in a relatively rotatable manner with respect thereto in a state of being engaged with the first and second side bevel gears.

The first output shaft functions as a first driving axle connected to a first wheel to which the first main driving wheel is mounted.

The second output shaft is connected through a transmission shaft along a vehicle widthwise direction to a second driving axle connected to a second wheel, to which the second main driving wheel is mounted, in a relatively non-rotatable manner around the axis line with respect thereto.

The first wheel may include a disk portion to which the first output shaft is coupled, and a rim portion that extends in the rotational axis line of the first wheel from an outer end of the disk portion in a radial direction.

In the configuration, an outer portion of the axle case in the vehicle widthwise direction is preferably inserted into the rim portion so that the ring gear is positioned within the rim portion.

Preferably, the axle unit may include a speed-reduction gear train that transmits rotational power of the axle input shaft to the ring gear while reducing the rotational speed thereof.

In order to achieve the second object, the present invention provides an HST unit including a pump shaft operatively connected to a driving power source, a hydraulic pump main body supported by the pump shaft in a relatively non-rotatable manner with respect thereto, a hydraulic motor main body fluidly connected through a pair of first and second HST lines to the hydraulic pump main body to form a closed circuit, a motor shaft supporting the hydraulic motor main body in a relatively non-rotatable manner with respect thereto, a capacity adjustment mechanism changing a capacity of at least one of the hydraulic pump main body and the hydraulic motor main body, and a HST case accommodating the hydraulic pump main body, the hydraulic motor main body and the capacity adjustment mechanism in a liquid tight manner, wherein the HST unit directly or indirectly outputs rotational power of the motor shaft, wherein there are provided a first HST fluid channel forming a part of the first HST line and a second HST fluid channel forming a part of the second HST line, wherein the first HST fluid channel includes a pump-side first HST fluid channel that is fluidly connected to the hydraulic pump main body, and a motor-side first HST fluid channel that is fluidly disconnected to the pump-side first HST fluid channel and is fluidly connected to the hydraulic motor main body, wherein the second HST fluid channel has a first end fluidly connected to the hydraulic pump main body and a second end fluidly connected to the hydraulic motor main body, and wherein the HST case is provided with a pump-side hydraulic fluid port and a motor-side hydraulic fluid port that are fluidly connected in a direct or indirect manner to the pump-side first HST fluid channel and the motor-side first HST fluid channel, respectively.

The HST unit according to the present invention could be applied to the hydraulic four-wheel-drive structure in which the main driving wheel is operatively driven by the hydraulic motor main body and the sub driving wheel separate from the main driving wheel is operatively driven by the sub hydraulic motor main body, in addition to the hydraulic two-wheel-drive structure in which only the main driving wheel is operatively driven by the hydraulic motor main body.

In order to achieve the second object, the present invention also provides an HST unit including a pump shaft operatively connected to a driving power source, a hydraulic pump main body supported by the pump shaft in a relatively non-rotatable manner with respect thereto, a hydraulic motor main body fluidly connected through a pair of first and second HST lines to the hydraulic pump main body to form a closed circuit, a motor shaft supporting the hydraulic motor main body in a relatively non-rotatable manner with respect thereto, a capacity adjustment mechanism changing a capacity of at least one of the hydraulic pump main body and the hydraulic motor main body, and a HST case accommodating the hydraulic pump main body, the hydraulic motor main body and the capacity adjustment mechanism in a liquid tight manner, wherein the HST unit directly or indirectly outputs rotational power of the motor shaft, wherein there are provided a pair of first and second HST fluid channels that forms the pair of first and second HST lines, respectively, a first communication fluid channel that has a first end fluidly connected to the first HST fluid channel, and a second communication fluid channel that has a first end fluidly connected to the second HST fluid channel, and wherein the HST case is provided with first and second hydraulic fluid ports that fluidly connected in a direct or indirect manner to second ends of the first and second communication fluid channels, respectively.

The HST unit according to the present invention could be applied to the hydraulic four-wheel-drive structure in which the main driving wheel is operatively driven by the hydraulic motor main body and the sub driving wheel separate from the main driving wheel is operatively driven by the sub hydraulic motor main body, in addition to the hydraulic two-wheel-drive structure in which only the main driving wheel is operatively driven by the hydraulic motor main body.

Preferably, the HST unit may further include an auxiliary pump main body driven by the pump shaft, a suction fluid channel having a first end opened in the HST case and a second end fluidly connected to a suction side of the auxiliary pump main body, a discharge fluid channel having a first end fluidly connected to a discharge side of the auxiliary pump main body, an HST charge fluid channel having a first end fluidly connected in a direct or indirect manner to the discharge fluid channel and a second end fluidly connected through a check valve to at least one of the pair of HST fluid channels, and a hydraulic-fluid extraction fluid channel having a first end fluidly connected to the discharge fluid channel, and the HST case may be provided with a hydraulic-fluid extraction port for extracting hydraulic fluid in the hydraulic-fluid extraction fluid channel to the outside.

More preferably, the HST unit may further include a charge relief valve for setting hydraulic pressure of the HST charge fluid channel.

In one embodiment, the HST case is provided with a hydraulic-fluid return port for introducing fluid, which has been returned from the outside, into the HST charge fluid channel.

Preferably, the HST unit may further include a hydraulic-fluid pressure setting fluid channel that has a first end fluidly connected to the discharge fluid channel or the hydraulic-fluid extraction fluid channel, and a hydraulic-fluid relief valve that is inserted in the hydraulic-fluid pressure setting fluid channel so as to have a primary side fluidly connected to the discharge fluid channel or the hydraulic-fluid pressure extraction fluid channel.

More preferably, a secondary side of the hydraulic-fluid relief valve is fluidly connected to the HST charge fluid channel.

BRIEF DESCRIPTION OF THE DRAWINGS/FIGURES

The above, and other objects, features and advantages of the present invention will become apparent from the detailed description thereof in conjunction with the accompanying drawings therein.

DETAILED DESCRIPTION OF THE INVENTION

First Embodiment

Hereinafter, there will be described a preferred embodiment of a working vehicle according to the present invention, with reference to the attached drawings.

Figure 1:
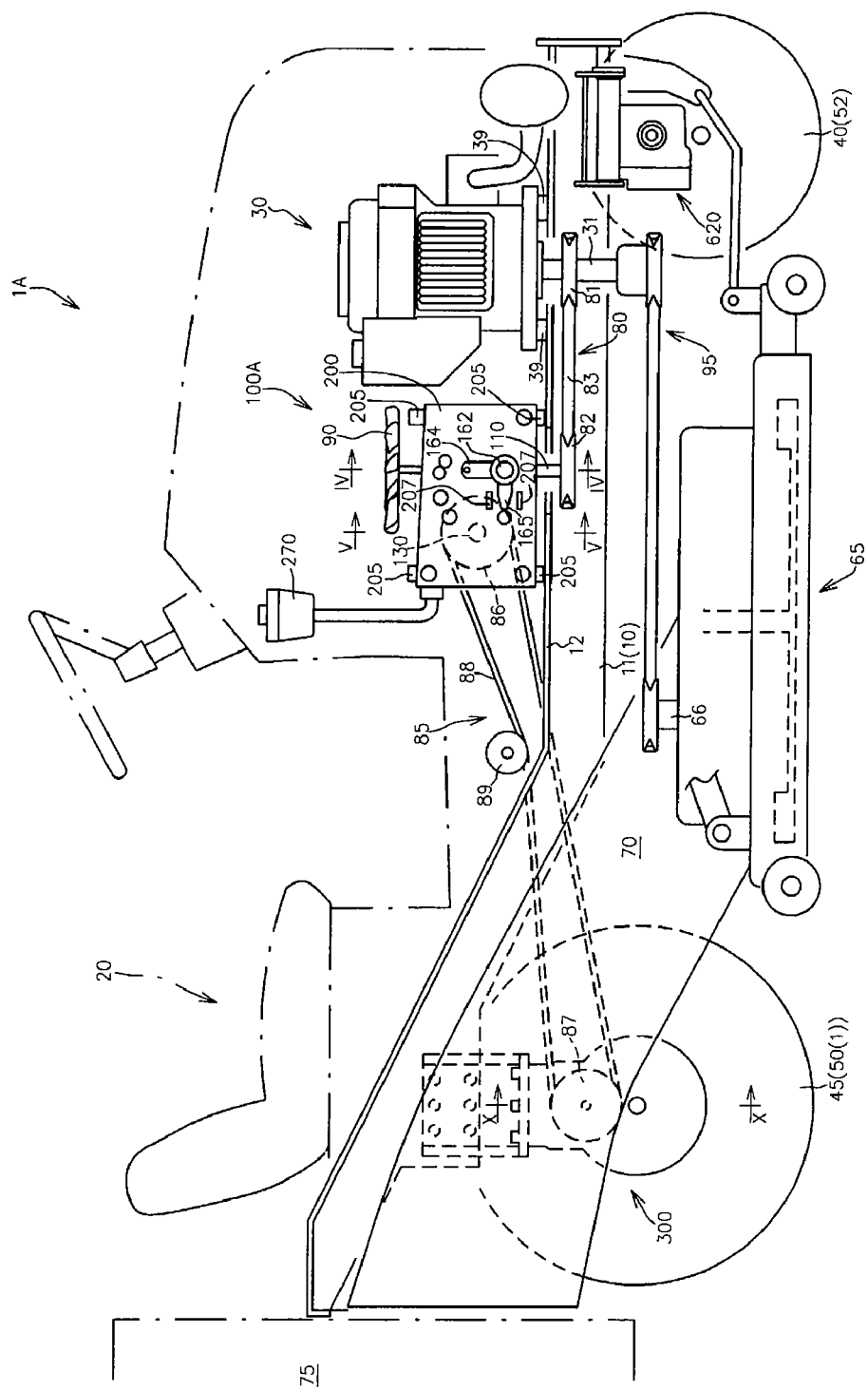
FIG. 1 is a side view of one embodiment of a working vehicle according to the present invention.
Figure 2:
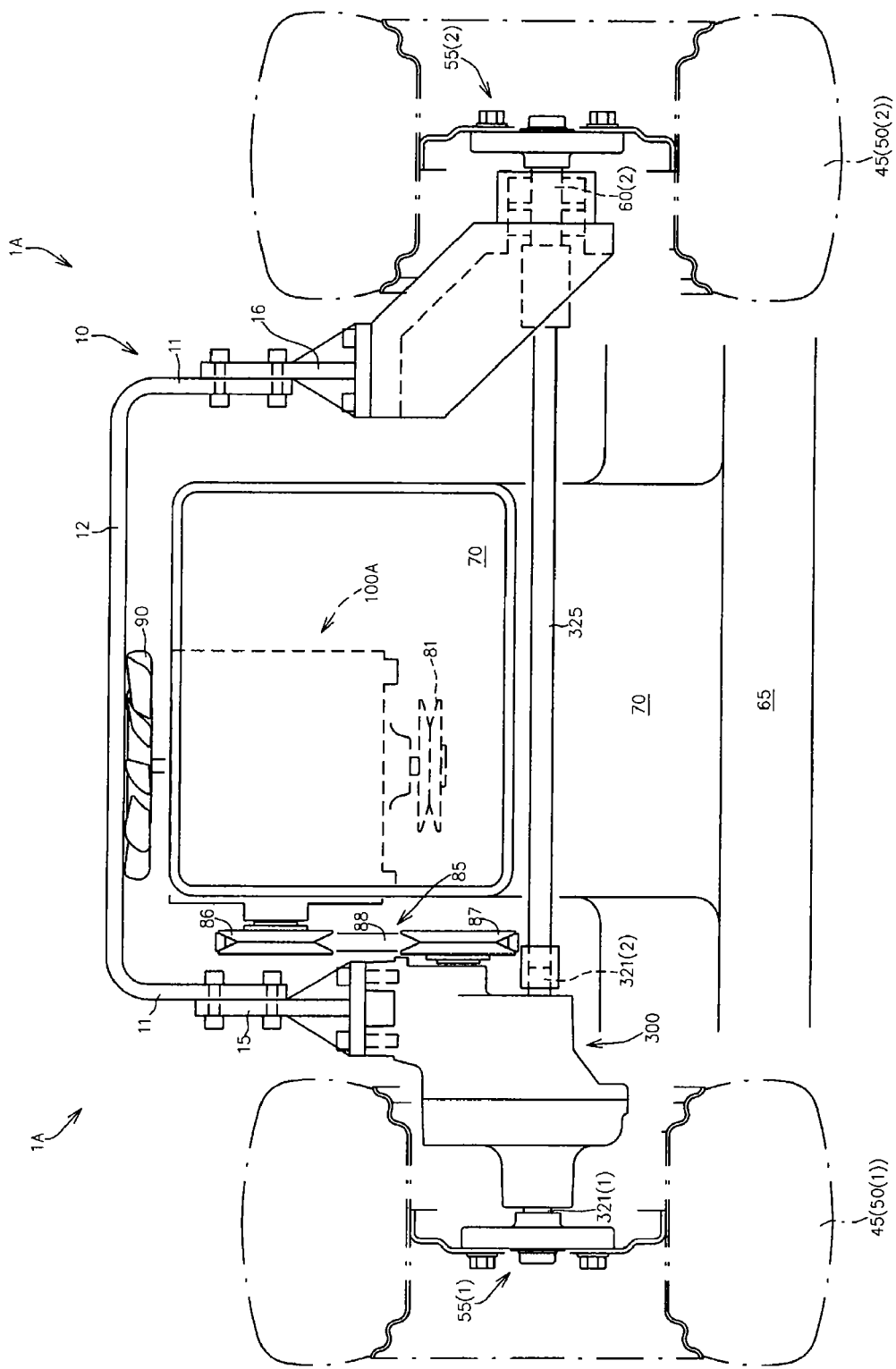
FIG. 2 is a rear view of the working vehicle shown in FIG. 1.
Figure 3:
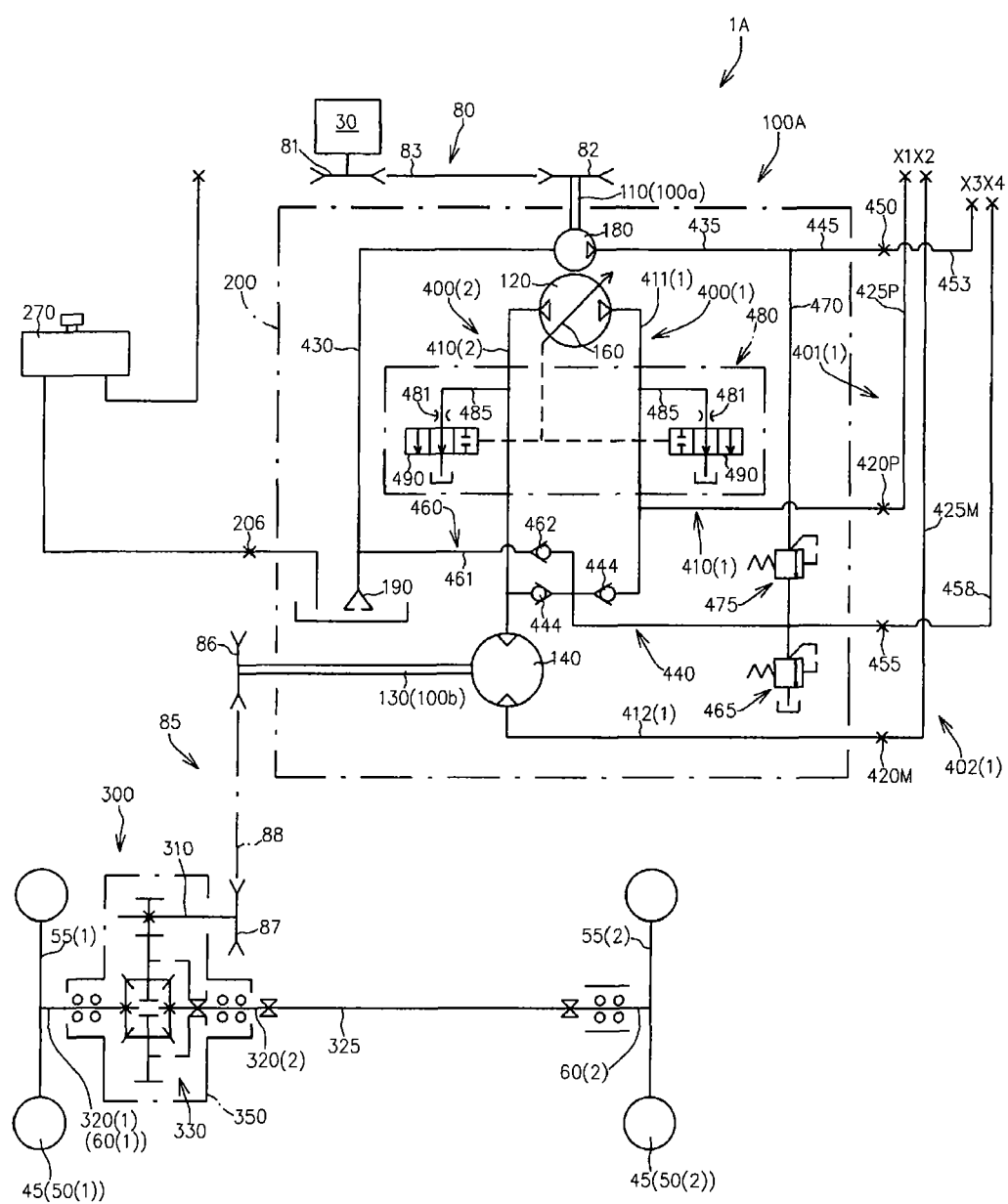
FIG. 3 is a hydraulic circuit diagram of the working vehicle shown in FIGS. 1 and 2.

FIGS. 1 to 3 illustrate a side view, a rear view and a hydraulic circuit diagram of a working vehicle 1A according to the present embodiment, respectively.

As illustrated in FIG. 1 and FIG. 2, the working vehicle 1A is structured as a mid-mount mower tractor having a mower device 65 at the center in a vehicle lengthwise direction and a rear discharge duct 70 between a pair of main driving wheels 50(1) and 50(2).

More specifically, as illustrated in FIGS. 1 to 3, the working vehicle 1A includes a vehicle frame 10 including a pair of main frames 11 provided along the vehicle lengthwise direction, a driver's seat 20 supported on the vehicle frame 10, a driving power source 30 supported by the vehicle frame 10, a pair of left and right front wheels 40 which are placed on one side in the vehicle lengthwise direction, a pair of left and right rear wheels 45 which are placed on the other side in the vehicle lengthwise direction, the mower device 65 which is placed between the front wheels 40 and the rear wheels 45 in the vehicle lengthwise direction, and the discharge duct 70 placed between the pair of rear wheels 45 for transferring grasses which have been cut by the mower device 65 to the outside of the vehicle (a rear side in the present embodiment).

Further, the working vehicle 1A includes an HST unit 100A including a hydraulic pump main body 120 which is operatively driven by the driving power source 30 and a hydraulic motor main body 140 fluidly connected to the hydraulic pump main body 120 through a pair of first and second HST lines 400(1) and 400(2) in such a way as to form a closed circuit and, also, being capable of outputting rotational power for driving the pair of wheels (the pair of rear wheels 45 in the present embodiment) of the pair of front wheels 40 and the pair of rear wheels 45 that function as the main driving wheels. Further, the working vehicle 1A includes an axle unit 300 including a differential gear device 330 for differentially transmitting the rotational power from the HST unit 100A to the pair of main driving wheels (hereinafter, referred to as first and second main driving wheels 50(1) and 50(2)), and a grass collector 75 for containing the cut grasses transferred thereto through the discharge duct 70.

As illustrated in FIG. 1, the driving power source 30 is supported in a vibration preventing manner by the vehicle frame 10 through vibration prevention rubbers 39.

More specifically, as illustrated in FIG. 1 and FIG. 2, in addition to the pair of main frames 11, the vehicle frame 10 includes a cross member 12 coupling the pair of main frames 11 to each other, and the driving power source 30 is supported in a vibration preventing manner on the cross member 12 through the vibration prevention rubbers 39.

In the present embodiment, as illustrated in FIG. 1, the driving power source 30 is embodied by a vertical crank shaft type having an output shaft 31 that extends along the vertical direction. The driving power source 30 is supported on an upper surface of the cross member 12 through the vibration prevention rubber 39, at a state where a distal end of the output shaft 31 extends below the cross member 12 through an opening formed in the cross member 12.

The output shaft 31 is operatively coupled to an HST input shaft 100a, which will be described later, in the HST unit 100A, through an upstream travel-system transmission mechanism 80 such as a pulley/belt transmission mechanism, as illustrated in FIG. 1 and FIG. 3.

The upstream travel-system transmission mechanism 80 includes a driving-side pulley 81 which is supported on the output shaft 31 in a relatively non-rotatable manner with respect thereto, a driven-side pulley 82 which is supported on the HST input shaft 100a in a relatively non-rotatable manner with respect thereto, and an endless-type transmission member 83 wound around the driving-side pulley 81 and the driven-side pulley 82.

The output shaft 31 is also operatively coupled to an input shaft 66 of the mower device 65 through a PTO-system transmission mechanism 95 such as a pulley/belt transmission mechanism.

Further, as a matter of cause, it is also possible to employ a driving power source of a horizontal crank shaft type (see FIG. 8 which will be described later), instead of a vertical crank shaft type, as the driving power source 30.

Figure 4:
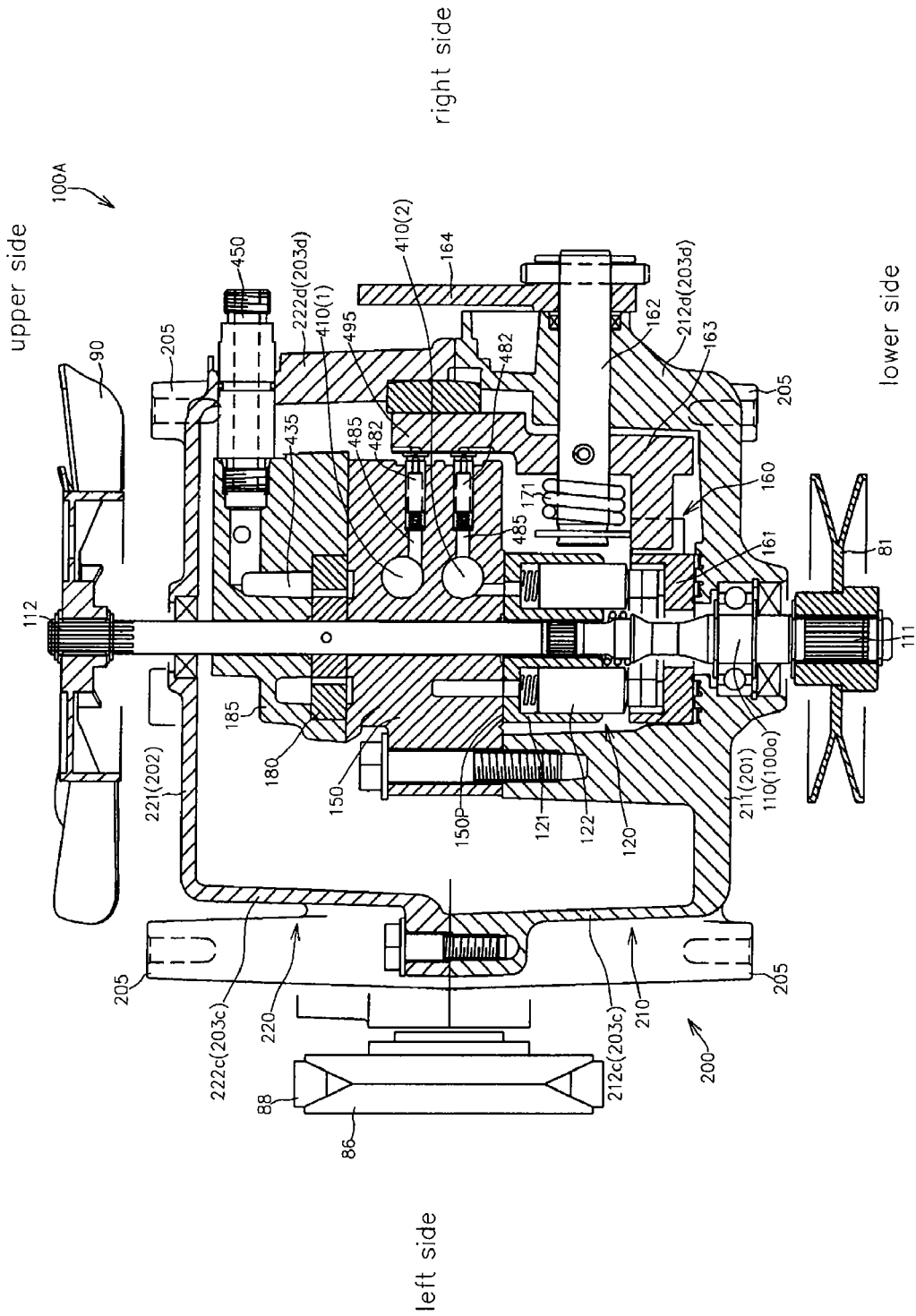
FIG. 4 is a vertical cross-sectional view of one embodiment of an HST unit according to the present invention, taken along the line IV-IV in FIG. 1.
Figure 5:
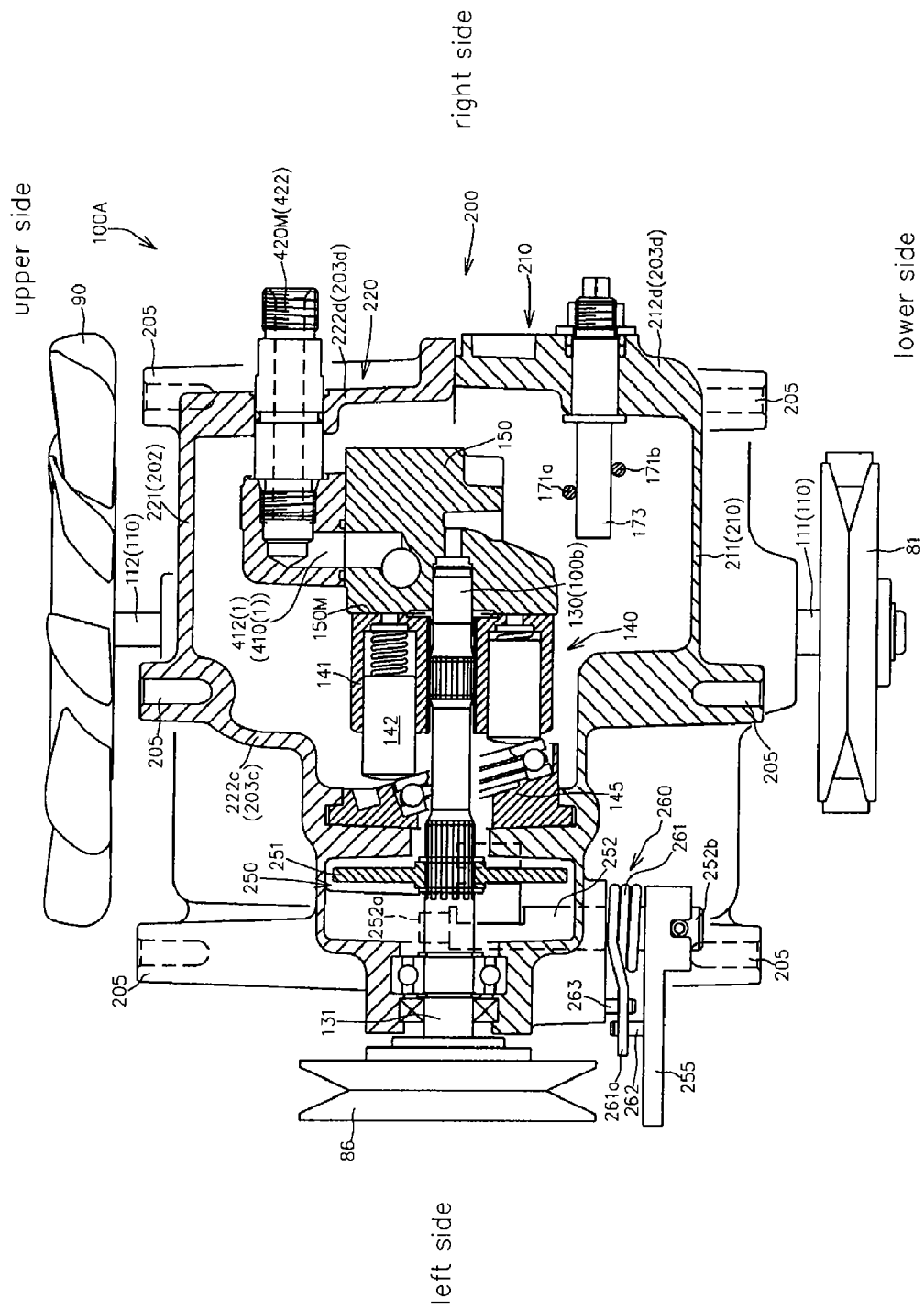
FIG. 5 is a vertical cross-sectional view of the HST unit, taken along the line V-V in FIG. 1.

FIGS. 4 and 5 illustrate vertical cross-sectional views of the HST unit 100A taken along the line IV-IV and the line V-V in FIG. 1, respectively.

Further, in FIGS. 4 and 5 and the following figures, the terms "upper side", "lower side", "front side", "rear side", "right side" and "left side" represent the upper side, the lower side, the front side, the rear side, the right side and the left side, as viewed with facing in a forward traveling direction of the working vehicle 1A in a state where the HST unit 100A is mounted in the working vehicle 1A.

As illustrated in FIGS. 1 to 5, in addition to the hydraulic pump main body 120 and the hydraulic motor main body 140, the HST unit 100A includes a capacity adjustment mechanism 160 for changing the capacity of at least one of the hydraulic pump main body 120 and the hydraulic motor main body 140, a center section 150 having a pump surface 150P and a motor surface 150M on which the hydraulic pump main body 120 and the hydraulic motor main body 140 are placed, respectively, an HST case 200 which accommodates, in a liquid tight manner, the hydraulic pump main body 120, the hydraulic motor main body 140, the capacity adjustment mechanism 160 and the center section 150, a pump shaft 110 and a motor shaft 130 which support the hydraulic pump main body 120 and the hydraulic motor main body 140, respectively, in a relatively non-rotatable manner with respect thereto, an HST input shaft 100a which is supported by the HST case 200 in a state capable of being operatively coupled to the driving power source 30, and an HST output shaft 100b which is supported by the HST case 200 in a state capable of outputting, to the outside, the rotational power of the hydraulic motor main body 140.

In the present embodiment, as illustrated in FIG. 4 and FIG. 5, the pump shaft 110 and the motor shaft 130 constitute the HST input shaft 100a and the HST output shaft 100b, respectively.

As illustrated in FIG. 4 and FIG. 5, the HST case 200 has a first and second case bodies 210 and 220 which are detachably coupled to each other, in such a way as to define an internal space for accommodating, in a liquid tight manner, the hydraulic pump main body 120, the hydraulic motor main body 140, the capacity adjustment mechanism 160 and the center section 150.

Figure 7:
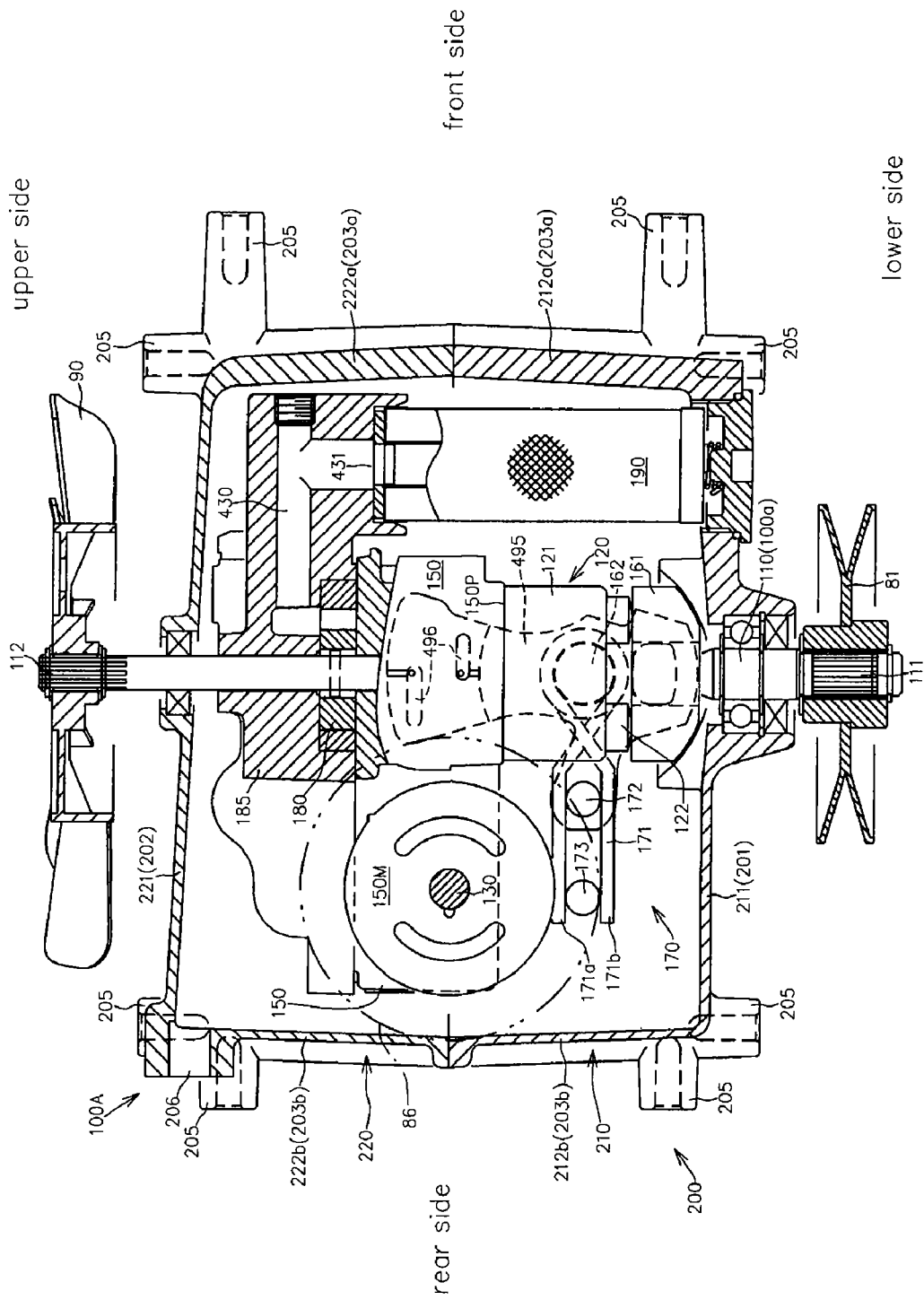
FIG. 7 is a vertical cross-sectional view of the HST unit, taken along the line VII-VII in FIG. 6.

More specifically, the first case body 210 is formed to have a hollow half-cubic shape having a substantially-rectangular shaped end wall 211 along a first plane, and first to fourth peripheral walls 212a-212d extending in the direction orthogonal to the first plane from a peripheral edge portion of the end wall 211, as illustrated in FIG. 4, FIG. 5 and FIG. 7 which will be described later.

On the other hand, the second case body 220 is formed to have a hollow half-cubic shape having a substantially-rectangular shaped end wall 221 along a second plane opposed to the first plane at a state where the second case body 220 is coupled to the first case body 210, and first to fourth peripheral walls 222a to 222d extending from a peripheral edge portion of the end wall 221 in the direction orthogonal to the second plane.

The first and second case bodies 210 and 220 are detachably coupled to each other at a state where free end surfaces of the first to fourth peripheral walls 212a to 212d and 222a to 222d are in contact with each other so as to form the HST case 200 having the internal space.

Specifically, the HST case 200 is formed to have a hollow, substantially-cubic shape having a first end wall 201 constituted by the end wall 211 of the first case body 210, a second end wall 202 which is opposed to the first end wall 201 and is constituted by the end wall 221 of the second case body 220, and first to fourth side walls 203a to 203d which are constituted by the first to fourth peripheral walls 212a to 212d and 222a to 222d of the first and second case bodies 210 and 220 and connect peripheral edge portions of the first and second end walls 201 and 202 to each other.

In the present embodiment, the HST case 200 is structured such that all the wall surfaces of the first end wall 201, the second end wall 202 and the first to fourth side walls 203a to 203d can be used as mounting surfaces.

Specifically, wall surfaces of all the first end wall 201, the second end wall 202 and the first to fourth side walls 203a to 203d are formed with mounting bosses 205, thereby increasing design freedom regarding mounting posture of the HST case 200.

In the present embodiment, as illustrated in FIG. 1, the HST case 200 is supported on the cross member 12 through the vibration prevention rubbers, using the mounting boss 205 provided on the first end wall 201 constituted by the end wall 211 of the first case 210.

Figure 6:
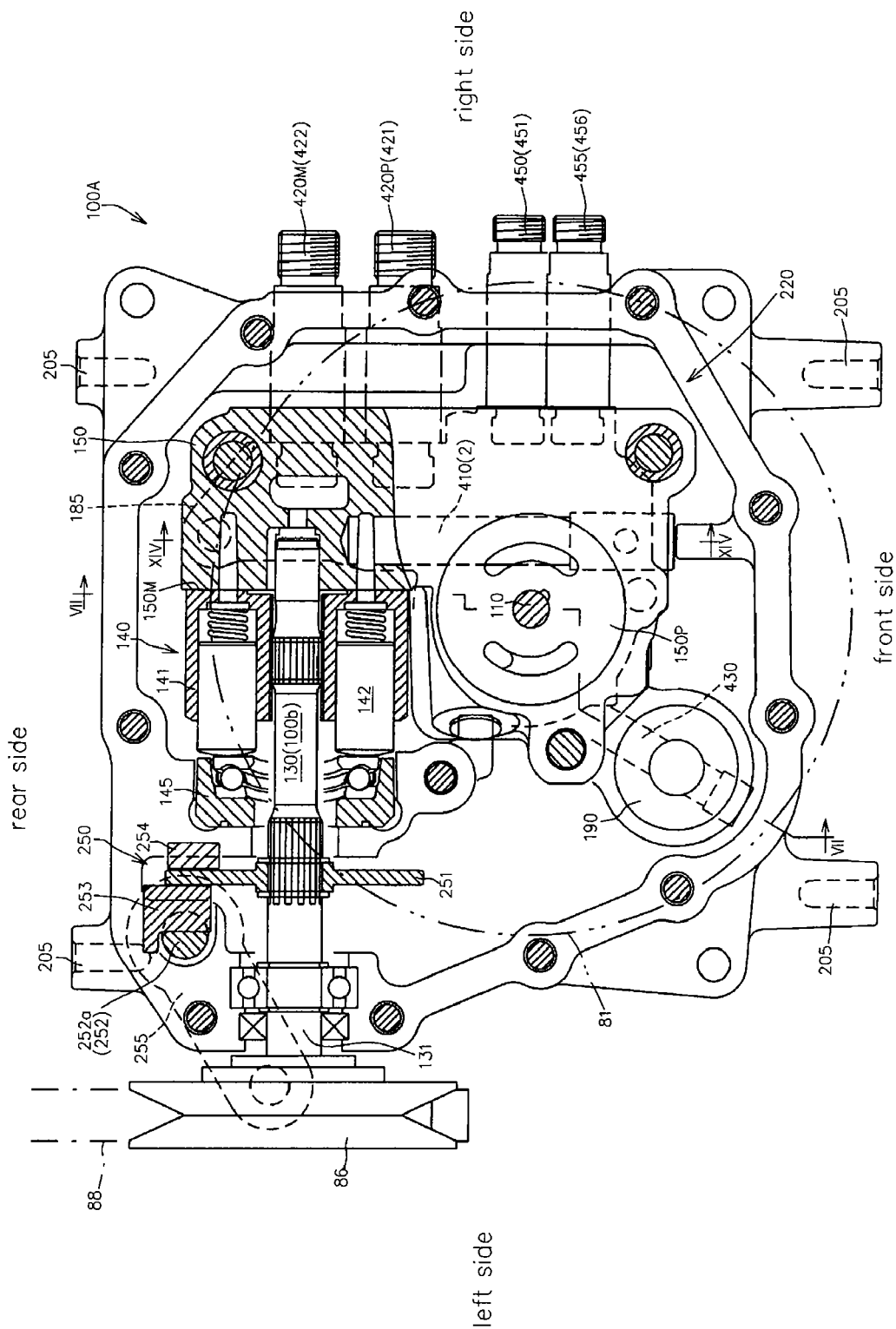
FIG. 6 is a bottom view of the HST unit and shows a state where a first case body and a hydraulic pump main body have been removed.

FIG. 6 illustrates a bottom view of the HST unit 100A at a state where the first case body 210 positioned on a lower side and the hydraulic pump main body 120 have been detached therefrom.

Further, FIG. 7 illustrates a cross-sectional view taken along the line VII-VII in FIG. 6. Further, in FIG. 7, the components are shown with being reversed in the vertical direction for ease of understanding.

The center section 150 is structured such that the motor surface 150M and the pump surface 150P are oriented in directions orthogonal to each other.

As illustrated in FIGS. 5 to 7, the center section 150 is accommodated within the HST case 200, such that the motor surface 150M is oriented in the vehicle widthwise direction and the pump surface is oriented in the vertical direction, at a state where the HST case 200 is mounted in the working vehicle 1A (at a state where the HST case 200 is supported on the vehicle frame 10, in the present embodiment).

In the present embodiment, as illustrated in FIG. 4, FIG. 6 and FIG. 7, the HST case 200 is placed on the cross member 12 of the vehicle frame 10, such that the motor surface 150M is oriented in the vehicle widthwise direction and the pump surface 150P is oriented in a downward direction.

As a matter of cause, the present invention is not limited to this embodiment.

For example, it is possible that the HST case 200 is supported directly or indirectly by the driving power source 30 in a state of being independent of the vehicle frame 10 (namely, in a state where the HST case 200 has not a direct connection with respect to the vehicle frame 10), such that the motor surface 150M is oriented in the vehicle widthwise direction and the pump surface 150P is oriented toward the driving power source.

Figure 8:
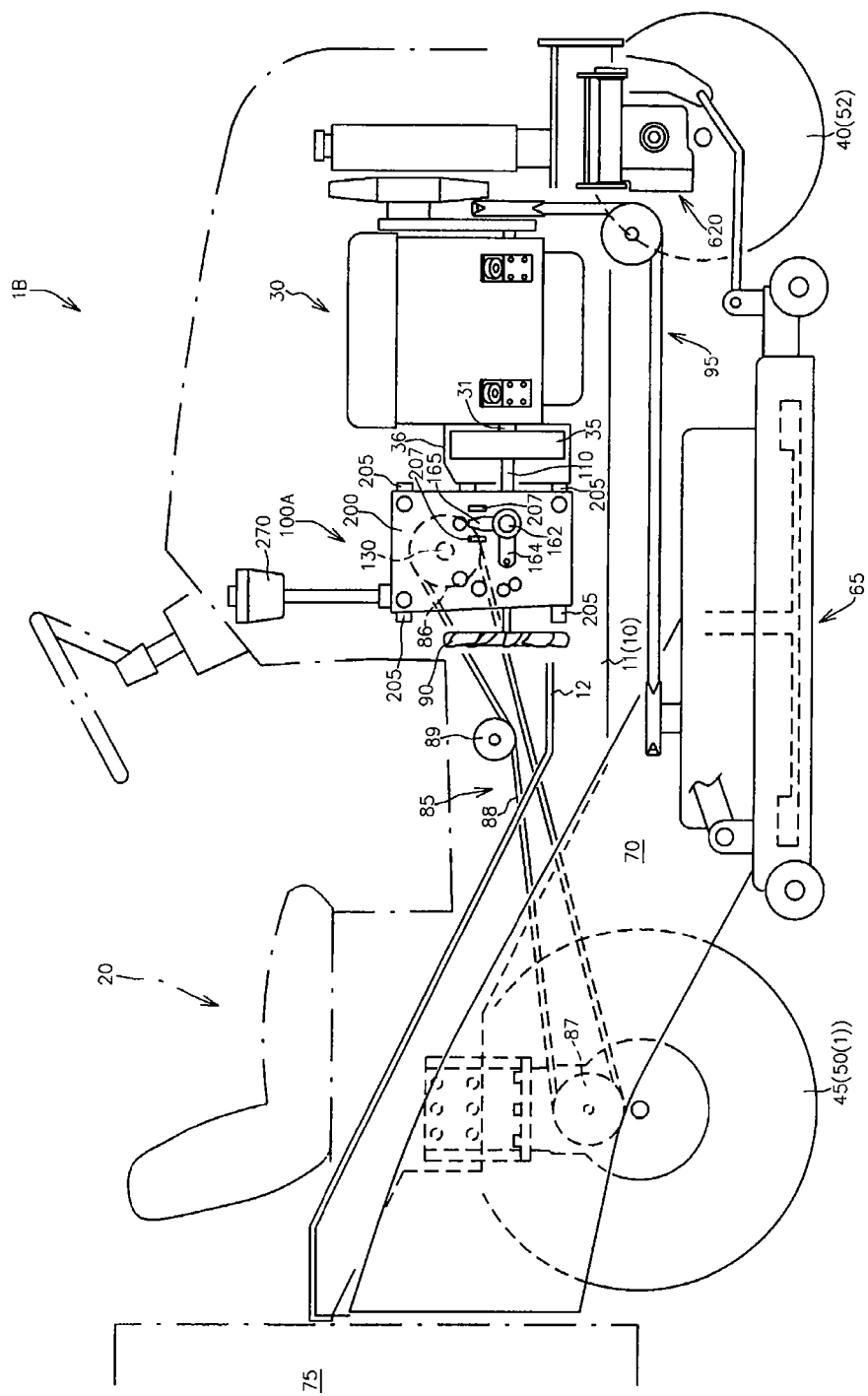
FIG. 8 is a side view of a modified example of the working vehicle according to the present invention.

FIG. 8 illustrates a side view of a working vehicle 1B at a state where the HST case 200 is supported by the driving power source 30 with a flywheel accommodating 36 interposed therebetween, such that the motor surface 150M is oriented in the vehicle widthwise direction and the pump surface 150P is oriented toward the driving power source 30.

In the working vehicle 1B illustrated in FIG. 8, the driving power source 30 is of a horizontal crank shaft type having an output shaft 31 that extends along a horizontal direction, and the pump shaft 110 is coupled to the output shaft 31 through a flywheel 35.

As illustrated in FIG. 8, with the configuration where the HST case 200 is supported directly or indirectly by the driving power source 30 at a state where the HST case 200 is independent of the vehicle frame 10, the driving power source 30 and the HST case 200 vibrate integrally against the vehicle frame 10, which prevents the occurrence of a vibration difference between the driving power source 30 and the HST case 200. Accordingly, it is possible to stably transmit driving power from the driving power source 30 to the HST unit 100A.

The center section 150 is formed with fluid channels including first and second HST fluid channels 410(1) and 410(2) constituting at least parts of the pair of first and second HST lines 400(1) and 400(2). The fluid channels will be described in detail, later.

The pump shaft 110 is supported by the center section 150 at a state of being orthogonal to the pump surface 150P.

As described above, in the present embodiment, the pump surface 150P is along a horizontal direction. Accordingly, the pump shaft 110 is supported by the center section 150 so as to be along the vertical direction.

In the present embodiment, as described above, the pump shaft 110 functions as the HST input shaft 100a.

Namely, as illustrated in FIG. 4, FIG. 5 and FIG. 7, the pump shaft 110 has at least a first end which extends outwardly so as to be operatively coupled to the driving power source 30.

More specifically, the pump shaft 110 is supported by the center section 150 and the HST case 200 in a rotatable manner about its axis line in a state where its first end (lower end) 111 extends downward from the HST case 200. The driven-side pulley 82 of the upstream travel-system transmission mechanism 80 is supported on the first end 111 of the pump shaft 110 in a relatively non-rotatable manner with respect thereto.

In the present embodiment, as illustrated in FIG. 4, FIG. 5 and FIG. 7, a second end (an upper end) 112 of the pump shaft 110 that is opposite from the first end 111 extends upward from the HST case 200. On the second end 112, a cooling fan 90 is supported in a relatively non-rotatable manner with respect thereto.

In the present embodiment, the hydraulic pump main body 120 is of an axial piston type.

Namely, as illustrated in FIG. 4, the hydraulic pump main body 120 includes a pump-side cylinder block 121 which is supported by the pump shaft 110 in a relatively non-rotatable manner with respect thereto, and plural pump-side pistons 122 which are accommodated in the pump-side cylinder block 121 in a relatively non-rotatable manner but in a reciprocating manner along the axial line with respect to the pump-side cylinder block 121.

The HST unit 100A according to the present embodiment is structured to be capable of changing the suction/discharge amount of the hydraulic pump main body 120.

Namely, the capacity adjustment mechanism 160 is structured to be capable of changing the amount of the capacity of the hydraulic pump main body 120, based on an operation from the outside.

More specifically, the capacity adjustment mechanism 160 includes a movable swash plate 161 which can be slanted about a slant axis line at a state of directly or indirectly engaging with free ends of the pump-side pistons to define a reciprocating range of the pump-side pistons 122 according to its slanting position. Further, the capacity adjustment mechanism 160 includes a control shaft 162 which is supported by the HST case 200 in a rotatable manner about its axis line at a state capable of being operated from the outside, the control shaft 162 slanting the movable swash plate 161 about the slant axis line according to its rotation about the axis line.

In the present embodiment, as illustrated in FIG. 4, the control shaft 162 has an inner end portion coupled to the movable swash plate 161 through a crank arm 163 and an outer end portion operatively coupled through a control arm 164 to a speed-change operation member (not illustrated) such as a speed-change pedal placed near the driver's seat 20.

Further, as illustrated in FIG. 1, on the outer end portion of the control shaft 162, a restriction arm 165 is also supported in a relatively non-rotatable manner with respect thereto. The restriction arm 165 is restricted in range of its swing movement by a pair of stopper members 207 provided on the outer surface of the HST case 200, thereby defining the range within which the movable swash plate 161 can be slanted about the slant axis line.

In the present embodiment, the movable swash plate 161 is structured to slant in both the forward and rearward directions across a neutral position.

Specifically, in response to an operation on the speed-change operation member in the forward or rearward direction, the control shaft 162 is rotated in one direction or the opposite direction about the axis line, thereby slanting the movable swash plate 161 in the forward or rearward direction about the slant axis line.

The speed-change operation member may be embodied by a seesaw-type or two-pedals type including a forward-travel pedal and a rearward-travel pedal, for example.

The capacity adjustment mechanism 160 is preferably provided with a neutral return mechanism 170.

As illustrated in FIG. 4, FIG. 5 and FIG. 7, the neutral return mechanism 170 includes, for example, a neutral biasing spring 171 having a center portion wound around the control shaft 162 and first and second end portions 171a and 171b which extend outwardly in the radial direction with the axis line of the control shaft 162 as a reference, a rotational pin 172 which rotates about the axis line of the control shaft 162 in response to the rotation of the control shaft 162 about the axis line and which is sandwiched between the first and second end portions 171a and 171b of the neutral biasing spring 171, and a neutral adjustment pin 173 which is supported by the HST case 200 so as to be sandwiched between the first and second end portions 171a and 171b of the neutral biasing spring 171.

As described above, the motor surface 150M is oriented in the vehicle widthwise direction, at a state where the HST case 200 is mounted in the working vehicle 1A.

Accordingly, the motor shaft 130 is supported by the center section 150 at a state of being along the direction orthogonal to the motor surface 150M, namely along the vehicle widthwise direction, as illustrated in FIG. 5 and FIG. 6.

As described above, in the present embodiment, the motor shaft 130 functions as the HST output shaft 100b.

Specifically, as illustrated in FIG. 5 and FIG. 6, the motor shaft 130 is supported by the HST case 200 and the center section 150 in a rotatable manner about its axis line, at a state where at least its first end 131 extends outwardly in such a way as to output the rotational power to the outside.

On the first end 131 of the motor shaft 130, a driving-side pulley 86 of a downstream travel-system transmission mechanism 85 which will be described later is supported in a relatively non-rotatable manner with respect thereto.

As illustrated in FIG. 5 and FIG. 6, the hydraulic motor main body 140 includes a motor-side cylinder block 141 which is supported by the motor shaft 130 in a relatively non-rotatable manner with respect thereto, and plural motor-side pistons 142 which are accommodated in the motor-side cylinder block 141 in a relatively non-rotatable manner but in a relatively reciprocating manner along the axial line direction with respect thereto.

In the present embodiment, the hydraulic motor main body 140 has a fixed capacity.

Namely, the HST unit 100A includes a fixed swash plate 145 for fixing the reciprocating range of the motor-side pistons, in addition to the aforementioned components.

Preferably, the fixed swash plate 145 is separable from the HST case 200 and, also, can be installed in the HST case 200 at plural different attitudes about the axis line of the motor shaft 130.

Figure 9:
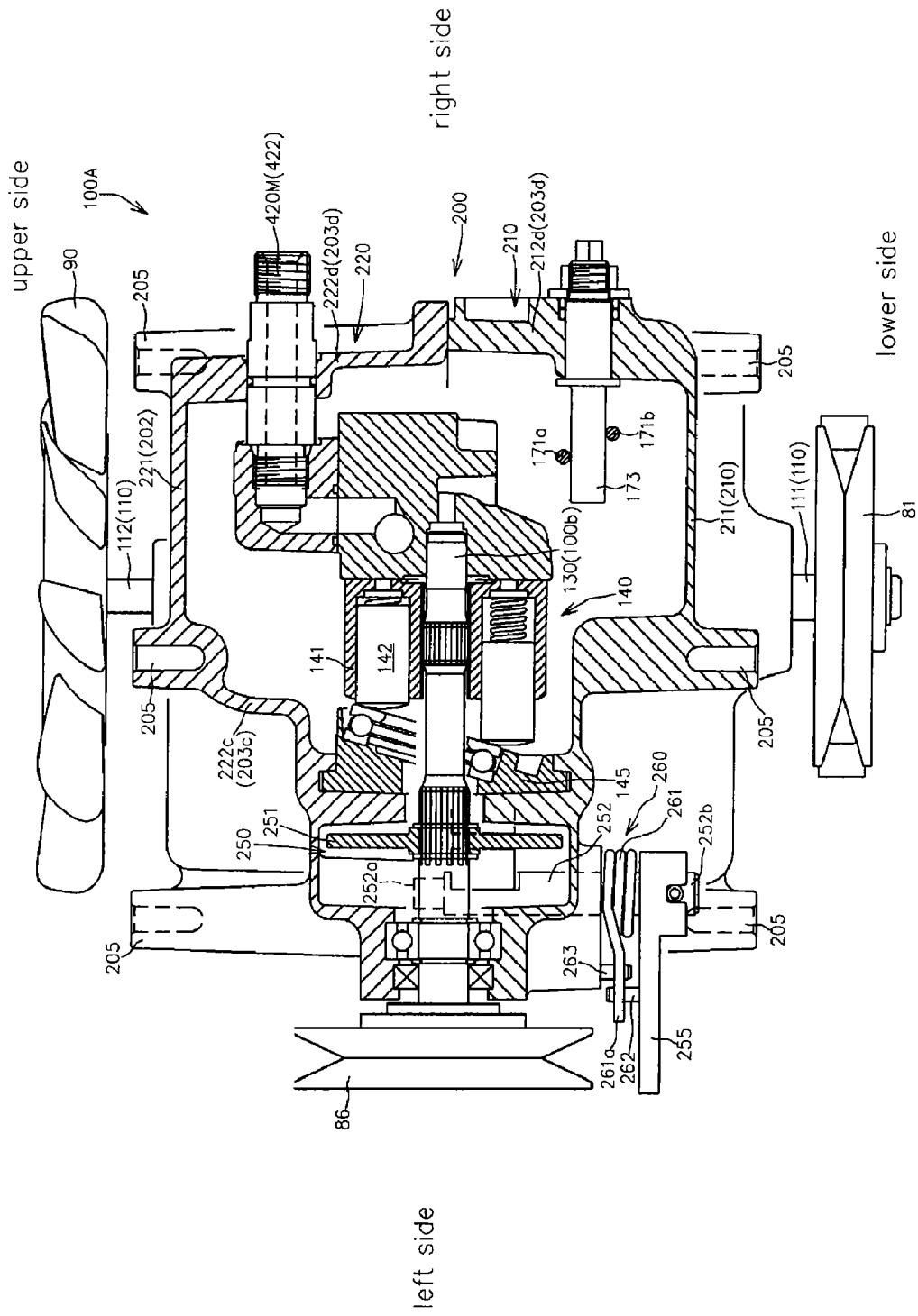
FIG. 9 is a vertical cross-sectional view of the HST unit and shows a state where a fixed swash plate for defining a suction/discharge amount of a hydraulic motor main body is mounted at a different position from an initial position.

In the present embodiment, the fixed swash plate 145 can be fixed in the HST case at a first attitude (see FIG. 5) about the axis line of the motor shaft 130 and, also, can be fixed therein at a second attitude (see FIG. 9) which is displaced by 180 degrees from the first attitude about the axis line of the motor shaft 130.

By configuring so that the fixed swash plate 145 can be fixed at the two attitudes displaced from each other by 180 degrees about the axis line of the motor shaft 130 as described above, it is possible to make a rotational direction of the axle input shaft 310 in a first layout where the HST unit 100A is placed such that an output end of the HST output shaft 100b protrudes in one direction along the vehicle widthwise direction same as that in a second layout where the HST unit 100A is placed such that the HST output shaft 100b protrudes in the opposite direction along the vehicle widthwise direction, without changing the structure for transmission from the driving power source 30 to the HST input shaft 100a and the structure for transmission from the HST output shaft 100b to the axle input shaft 310.

Specifically, by mounting the fixed swash plate 145 at the first attitude in a case of the first layout and mounting the fixed swash plate 145 at the second attitude in a case of the second layout, it is possible to make the rotational direction of the axle input shaft 310 in the first layout to be coincident with that in the second layout, without changing the transmission structures in the remaining parts, thereby increasing design freedom regarding the position at which the HST unit 100A is installed.

The hydraulic motor main body 140 is preferably configured so as to have a capacity smaller than that of the hydraulic pump main body 120.

With this structure, the hydraulic motor main body 140 is hydraulic drive in a speed-reduction manner by the hydraulic pump main body 120, thereby enabling reduction of the size of a driven-side pulley 87 supported on the axle input shaft 310, which will be described later.

In the present embodiment, the HST unit 100A further includes a brake mechanism 250.

As illustrated in FIG. 5 and FIG. 6, the brake mechanism 250 includes a brake disk 251 which is supported on the motor shaft 130 in a relatively non-rotatable manner with respect thereto within the HST case 200, a brake operation shaft 252 is supported by the HST case 200 in a rotatable manner about its axis line in a state of having a first end side 252a that has a non-circular cross-section and is faced to the brake disk 251 and a second end 252b that extends outward from the HST case 200, a pushing pad 253 supported on the first end 252a of the brake operation shaft 252, and a fixed pad 254 placed at the opposite side of the brake disk 251 from the pushing pad 253.

On the second end 252b of the brake operation shaft 252, a brake arm 255 is supported in a relatively non-rotatable manner with respect thereto, as illustrated in FIG. 5, and the brake arm 255 is operatively coupled to a brake operation member (not illustrated) such as a brake pedal placed near the driver's seat 20 through a suitable coupling member.

Accordingly, when the brake operation member is operated, the brake operation shaft 252 rotates about the axis line through the brake arm 255, thereby causing the pushing pad 253 to sandwich the brake disk 251 between the pushing pad 253 and the fixed pad 254.

Preferably, the brake mechanism 250 is provided with a brake-release biasing mechanism 260.

As illustrated in FIG. 5, the brake-release biasing mechanism 260 includes a brake-release spring 261 having a center portion wound around the brake operation shaft 252, and a first end portion 261a and a second end portion (not illustrated) which extend outwardly in the radial direction with the axis line of the brake operation shaft 252 as a reference, a rotational pin 262 which rotates about the axis line of the brake operation shaft 252 in accordance with the rotation of the brake operation shaft 252 about the axis line and is sandwiched between the first end portion 261a and the second end portion of the brake-release spring 261, and a fixed pin 263 which is supported by the HST case 200 so as to be sandwiched between the first end portion 261a and the second end portion of the brake-release spring 261.

As illustrated in FIG. 3, the HST unit 100A further includes an auxiliary pump main body 180 which is operatively driven by the pump shaft 110.

The auxiliary pump main body 180 functions as a charge fluid source for supplying a hydraulic fluid to the HST which is constituted by the hydraulic pump main body 120 and the hydraulic motor main body 140 and, also, functions as a hydraulic fluid source for supplying the hydraulic fluid to an external hydraulic actuator.

In the present embodiment, as illustrated in FIG. 4 and FIG. 7, the auxiliary pump main body 180 is driven and rotated by the pump shaft 110 at the opposite side of the center section 150 from the pump surface 150P at a state where the stored fluid in the HST case 200 is used as a fluid source.

The HST unit 100A further includes an auxiliary pump case 185 which is coupled to the center section 150 in such a way as to surround the auxiliary pump main body 180 to form a fluid channel block in cooperation with the center section 150, and a filter 190 inserted in a suction line for the auxiliary pump main body 180, as illustrated in FIG. 4 and FIG. 7.

The fluid channels for the auxiliary pump main body 180 will be described later.

Figure 10:
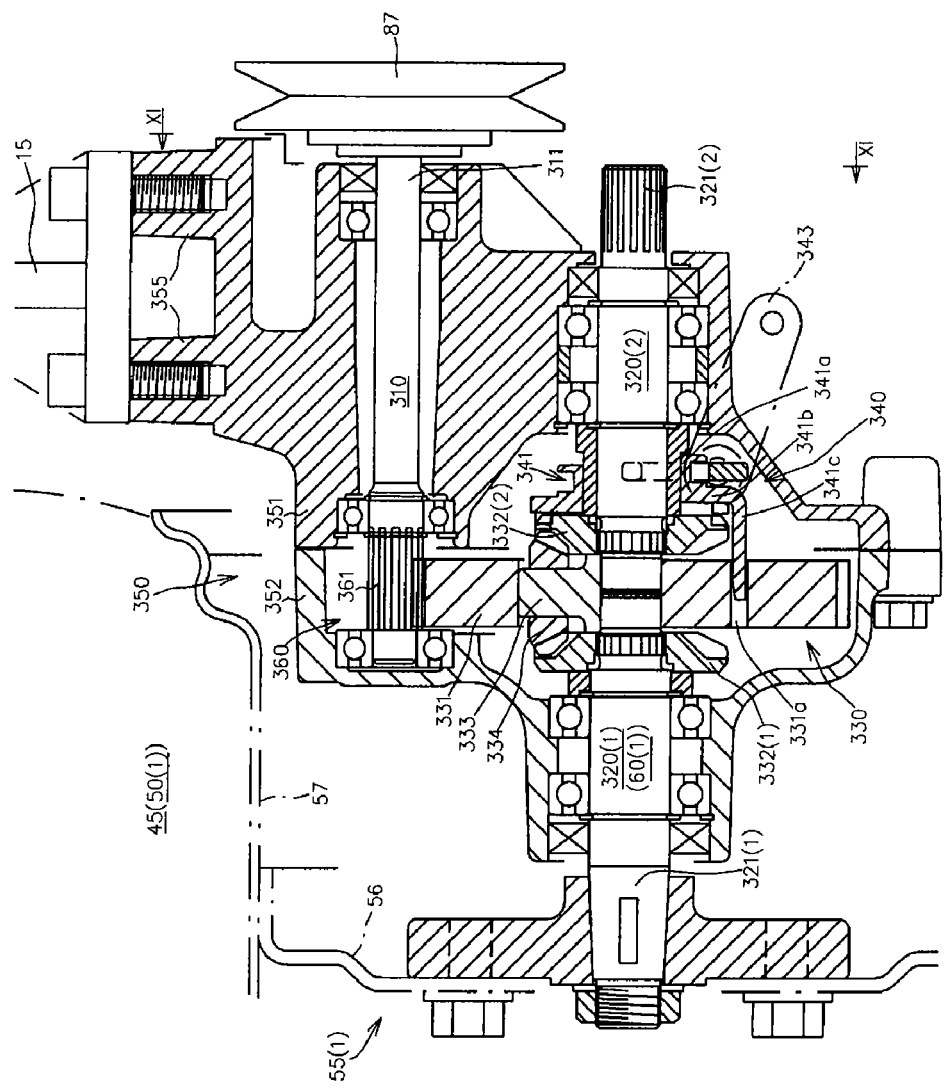
FIG. 10 is a cross-sectional view taken along the line X-X in FIG. 1 and shows a vertical cross-sectional view of an axle unit of the working vehicle.

FIG. 10 illustrates a vertical cross-sectional view of the axle unit 300 taken along the line X-X in FIG. 1.

Figure 11:
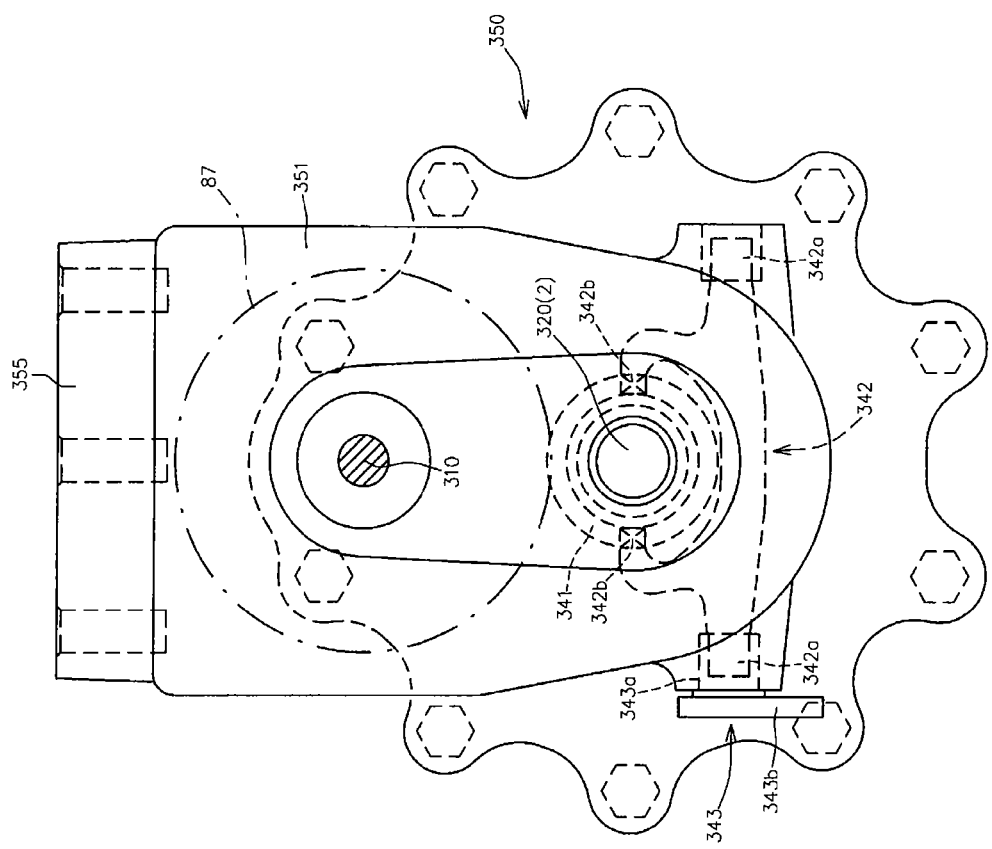
FIG. 11 is an end view of the axle unit, taken along the line XI-XI in FIG. 10.

Further, FIG. 11 illustrates an end view of the axle unit 300 taken along the line XI-XI in FIG. 10.

As illustrated in FIG. 10 and FIG. 11, the axle unit 300 includes an axle case 350, an axle input shaft 310 which is supported by the axle case 350 at a state of having a first end 311 that extends outwardly so as to input the rotational power from the HST unit 100A, first and second main output shafts 320(1) and 320(2) which output rotational power to the first and second main driving wheels 50(1) and 50(2), and the differential gear device 330 accommodated in the axle case 350 in such a way as to differentially transmit the rotational power inputted thereto directly or indirectly from the axle input shaft 310 to the first and second output shafts 320(1) and 320(2).

As illustrated in FIG. 2 and FIG. 10, the axle case 350 is supported by the vehicle frame 10 so as to be placed near one (the first main driving wheel 50(1) in the present embodiment) of the pair of first and second main driving wheels 50(1) and 50(2).

In the present embodiment, the axle case 350 is supported through a mounting frame 15 by the main frame 11 which is positioned closer to the corresponding one main driving wheel (the first main driving wheel 50(1)), as illustrated in FIG. 2.

The axle case 350 has first and second case bodies 351 and 352 that are detachably coupled to each other so as to form an internal space for accommodating the differential gear device 330.

In the present embodiment, as illustrated in FIG. 10, the first and second case bodies 351 and 352b are coupled to each other in a separable manner in the vehicle widthwise direction.

Further, as illustrated in FIG. 10, the first case body 351 that is positioned on an inner side in the vehicle widthwise direction is provided at the upper surface with mounting bosses 355, and the mounting frame 15 is coupled to the upper surface of the first case body 351 utilizing the mounting bosses 355.

The axle input shaft 310 is supported by the axle case 350 in a rotatable manner about an axis line, in a state where it is along the vehicle widthwise direction when the axle case 350 is supported directly or indirectly by the vehicle frame 10 and the first end 311 positioned on the opposite side from the corresponding main driving wheel 50(1) is extended outwardly, as illustrated in FIG. 10.

The axle input shaft 310 is operatively coupled to the HST output shaft 100b (the motor shaft 130 in the present embodiment) through an endless type transmission member 88 such as a belt.

Namely, the working vehicle 1A includes a downstream travel-system transmission mechanism 85 for transmitting the rotational power from the HST output shaft 100b to the axle input shaft 310, in addition to the aforementioned components, as illustrated in FIG. 1 and FIG. 2 and the like.

As illustrated in FIGS. 1 to 3 and the like, the downstream travel-system transmission mechanism 85 includes the driving-side pulley 86 which is supported by the first end 131 of the HST output shaft 100b (the motor shaft 130 in the present embodiment) in a non-rotatable manner with respect thereto, the driven-side pulley 87 which is supported by the first end 311 of the axle input shaft 310 in a relatively non-rotatable manner with respect thereto, and an endless-type transmission member 88 such as a belt which is wound around the driving-side pulley 86 and the driven-side pulley 87.

The downstream travel-system transmission mechanism 85 is provided with a tension pulley 89 for applying a tension to the endless-type transmission member 88, as illustrated in FIG. 1.

In the present embodiment, the tension pulley 89 is configured so as to take a tension application state of applying a tension to the endless-type transmission member 88 and a tension release state of releasing the tension, according to a manual operation.

By bringing the tension pulley 89 into the tension release state, it is possible to effectively prevent an occurrence of a pressure difference between the pair of HST lines 400(1) and 400(2) even when the working vehicle 1A is forcibly towed such as in the event of a failure of the driving power source 30 or the HST and the like so that the hydraulic motor main body 140 is rotated in response to the rotation of the first and second driving wheels 50(1) and 50(2).

As described above, in the working vehicle 1A according to the present embodiment, the axle unit 300 is supported directly or indirectly by the vehicle frame 10 so as to be placed near the first main driving wheel 50(1) at a state where the axle input shaft 310 is along the vehicle widthwise direction, the HST unit 100A is placed such that the HST output shaft 100b is along the vehicle widthwise direction at a position spaced apart from the axle unit 300, and the HST output shaft 100b and the axle input shaft 310 are operatively coupled to each other through the endless-type transmission member 88.

With this structure, as illustrated in FIG. 2, it is possible to provide a free space as large as possible between the pair of main driving wheels 50(1) and 50(2), thereby increasing the design freedom of the vehicle.

In the present embodiment, as illustrated in FIG. 2, the discharge duct 70 extends in the vehicle lengthwise direction, utilizing the free space.

The first and second output shafts 320(1) and 320(2) are supported by the axle case 350 so as to be positioned coaxially with the rotational axis line of the first and second main driving wheels 50(1) and 50(2), at one side and the other side in the vehicle widthwise direction, with the differential gear device 330 sandwiched therebetween.

More specifically, as illustrated in FIG. 10, the first output shaft 320(1) is supported by the axle case 350 so as to be positioned coaxially with the rotational axis line of the first main driving wheel 50(1), at a state where its first end 321(1) positioned on a side closer to the corresponding first main driving wheel 50(1) is extended outwardly.

In the present embodiment, as illustrated in FIG. 10, the first end 321(1) of the first output shaft 320(1) is directly coupled to a first wheel 55(1) to which the first main driving wheel 50(1) is mounted. Namely, the first output shaft 320(1) constitutes a first driving axle 60(1) which is coupled to the first wheel 55(1).

On the other hand, as illustrated in FIG. 2 and FIG. 10, the second output shaft 320(2) is supported by the axle case 350 so as to be positioned on the same axis as the rotational axis line of the second main driving wheel 50(2), at a state where its first end 321(2) positioned on a side closer to the corresponding second main driving wheel 50(2) (on a side opposite from the first main driving wheel 50(1)) is extended outwardly.

As illustrated in FIG. 2, the second output shaft 320(2) is coupled through a transmission shaft 325 along the vehicle widthwise direction to a second wheel 55(2) to which the second main driving wheel 50(2) is mounted.

More specifically, as illustrated in FIG. 2, a second driving axle 60(2) is coupled to the second wheel 55(2). The second driving axle 60(2) is supported through a mounting frame 16 by the corresponding main frame 11 (the main frame positioned on a side closer to the second main driving wheel 50(2)) in a rotatable manner about an axis line.

The second output shaft 320(2) is coupled to the second driving axle 60(2) through the transmission shaft 325 in a relatively non-rotatable manner about the axis line with respect thereto.

Further, the discharge duct 70 extends in the vehicle lengthwise direction, utilizing a portion of the free space between the pair of main driving wheels 50(1) and 50(2) that is positioned above the transmission shaft 325.

The differential gear device 330 includes a ring gear 331 placed coaxially with the rotational axis line of the first and second output shafts 320(1) and 320(2) at a state of being operatively coupled to the axle input shaft 310, first and second side bevel gears 332(1) and 332(2) which are supported on the first and second output shafts 320(1) and 320(2), respectively, in a relatively non-rotatable manner with respect thereto, a pinion shaft 333 which extends in the direction orthogonal to the rotational axis line of the first and second output shafts 320(1) and 320(2) and rotates about the rotational axis line of the first and second output shafts 320(1) and 320(2) together with the ring gear 331, and a bevel pinion 334 which is supported on the pinion shaft 333 in a relatively rotatable manner with respect thereto at a state of being engaged with the first and second side bevel gears 332(1) and 332(2).

In the present embodiment, the differential gear device 330 is provided with a differential-lock mechanism 340.

As illustrated in FIG. 10 and FIG. 11, the differential-lock mechanism 340 includes a differential-lock slider 341 which rotates about the rotational axis line of the first and second output shafts 320(1) and 320(2) together with the ring gear 331 and is capable of moving along the rotational axis line, and a differential-lock fork 342 which is supported by the axle case 350 so as to move the differential-lock slider 341 along the rotational axis line according to an operation from the outside.

The differential-lock slider 341 is supported on one (the second output shaft 320(2) in the illustrated embodiment) of the first and second output shafts 320(1) and 320(2) in a relatively non-rotatable manner and in a movable manner in the axis line with respect thereto.

More specifically, the differential-lock slider 341 includes a support portion 341a supported on the corresponding output shaft 320(2), a radial extending portion 342b extending outwardly in the radial direction from the support portion 341a so as to be faced to the side bevel gear 332(2) supported on the corresponding output shaft 320(2), and an axial extending portion 342c extending in the direction of the rotational axis line form the radial extending portion 342b toward the ring gear 331.

The radial extending portion 341b is coupled to the side bevel gear 332(2) in a relatively non-rotatable manner with respect thereto, according to the position of the differential-lock slider 341 in the rotational axis line.

More specifically, the radial extending portion 341b has one of a concave portion and a convex portion at its surface facing to the side bevel gear 332(2) and, also, the side bevel gear 332(2) has the other one of a concave portion and a convex portion at its surface facing to the radial extending portion 341b, so that the concave portion and the convex portion can be selectively engaged or disengaged with or from each other according to the position of the differential-lock slider 341 in the rotational axis line.

As illustrated in FIG. 10, the axial extending portion 341c is engaged into a slit 331a provided in the ring gear 331, so that the differential-lock slider 341 rotates together with the ring gear 331 about the rotational axis line of the first and second output shafts 320(1) and 320(2).

The differential-lock fork 342 is structured so as to move the differential-lock slider 341 in the rotational axis line, based on an operation from the outside.

More specifically, as illustrated in FIG. 11, the differential-lock fork 342 includes rotational shaft portions 342a which are along the direction orthogonal to the rotational axis line and are supported directly or indirectly by the axle case 350 in a rotatable manner about its axis line, and engagement portions 342b extending from the rotational shaft portions 342a such that their free ends engage with the differential-lock slider 341.

In the present embodiment, the differential-lock fork 342 has a pair of rotational shaft portions 342a which are faced to each other with the differential-lock slider 341 sandwiched therebetween.

Further, a differential-lock arm 343 is coupled to one of the pair of rotational shaft portions 342a in a relatively non-rotatable manner with respect thereto.

Specifically, the differential-lock arm 343 includes a supporting shaft portion 343a which is supported by the axle case 350 in a rotatable manner about its axis line, and an arm portion 343b which is coupled to the supporting shaft portion 343a in a relatively non-rotatable manner with respect to thereto such that the arm portion 343b is positioned outside of the axle case 350.

In this structure, one of the pair of rotational shaft portions 342a is coupled to the supporting shaft portion 343a in a relatively non-rotatable manner about the axis line with respect thereto.

The arm portion 343b is operatively coupled through a suitable link mechanism (not illustrated) to a differential-lock operation member (not illustrated) which can be manually operated and is placed near the driver's seat 20.

By providing the differential-lock mechanism 340, it is possible to easily attain changeover between a differential state for differentially driving the first and second main driving wheels 50(1) and 50(2), and a differential-lock state for forcibly driving the first and second main driving wheels 50(1) and 50(2) at the same speed.

Preferably, it is possible to transmit the rotational power from the axle input shaft 310 to the differential gear device 330 while reducing the speed thereof, which enables reduction of the diameter of the driven-side pulley 87 which is supported on the axle input shaft 310 in a relatively non-rotatable manner with respect thereto.

In consideration of this point, the axle unit 300 includes a speed-reduction gear train 360 for transmitting the rotational power from the axle input shaft 310 to the ring gear 331 while reducing the speed thereof, in addition to the aforementioned components.

In the present embodiment, as illustrated in FIG. 10, the axle input shaft 310 is provided with a gear 361 in a relatively non-rotatable manner with respect thereto, the gear 361 having a smaller diameter and engaging with the ring gear 331. The gear 361 and the ring gear 331 constitutes the speed-reduction gear train 360.

As described above, in the working vehicle 1A according to the present embodiment, the brake mechanism 250 for selectively applying a braking force to the travel-system transmission path from the driving power source 30 to the pair of main driving wheels 50(1) and 50(2) is provided in the HST unit 100A which is positioned on an upstream side of the axle unit 300 in the power transmission direction.

Namely, the brake mechanism 250 is placed upstream of the speed-reduction gear train 360 in the axle unit 300 in the direction of the transmission.

With this structure, it is possible to reduce the brake capacity required for the brake mechanism 250, thereby enabling reduction of the size of the brake mechanism 250.

Further, the HST unit 100A including the brake mechanism 250 is placed away from the axle unit 300.

Accordingly, it is possible to simplify the structure for coupling the brake mechanism 250 to the brake operation member placed near the driver's seat 20, in comparison with a structure in which a brake mechanism is positioned near the first and second driving wheels 50(1) and 50(2).

In the present embodiment, as illustrated in FIG. 10, a portion of the axle case 350 is protruded into a rim portion 57 of the first wheel 55(1), such that the ring gear 331 of the differential gear device 330 that is positioned between the first and second output shafts 320(1) and 320(2) is positioned within the rim portion 57. This can increase the size of the free space between the first and second main driving wheels 50(1) and 50(2) as much as possible.

Namely, as illustrated in FIG. 10, the first wheel 55(1) includes a disk portion 56 to which the first output shaft 320(1) functioning as the first driving axle 60(1) is coupled, and the rim portion 57 extending in the rotational axis line of the first main driving wheel 50(1) from an outer end of the disk portion 56 in a radial direction.

An outer portion of the axle case 350 in the vehicle widthwise direction is inserted into the rim portion 57, such that the ring gear 331 is positioned within the rim portion 57 at a state where the first end 311 of the axle input shaft 310 is positioned inward of the first main driving wheel 50(1) in the vehicle widthwise direction.

Hereinafter, the hydraulic structure in the working vehicle 1A will be described.

At first, the pair of HST lines 400(1) and 400(2) will be described.

Figure 12:
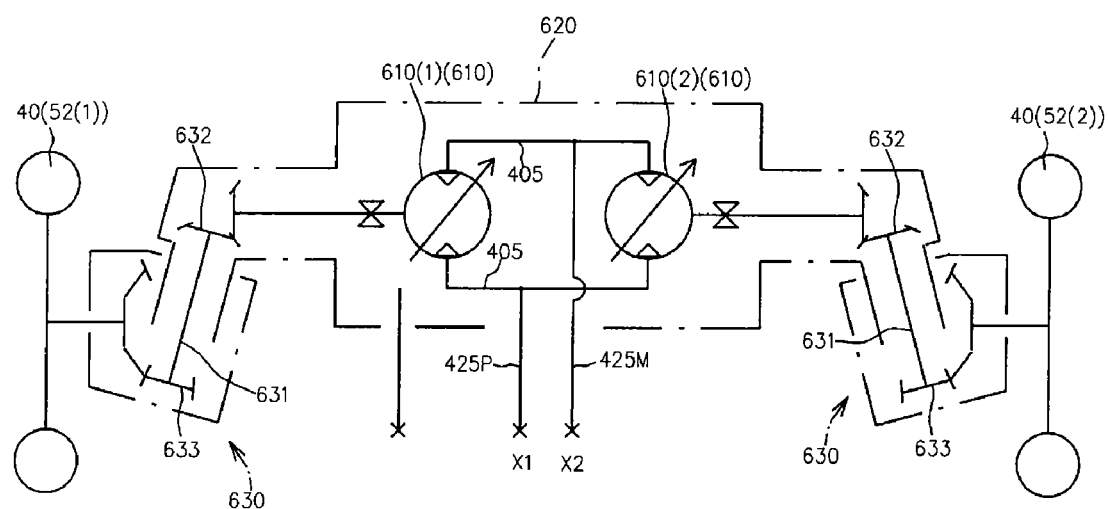
FIG. 12 is a hydraulic circuit diagram of a portion that is fluidly connected to reference numerals X1 and X2 in FIG. 3, and shows the hydraulic circuit diagram for hydraulically driving a sub hydraulic motor main body that drives a sub driving wheel in the working vehicle.

FIG. 12 illustrates a hydraulic circuit diagram of a portion which is fluidly connected to reference numerals X1 and X2 in FIG. 3.

Figure 13:
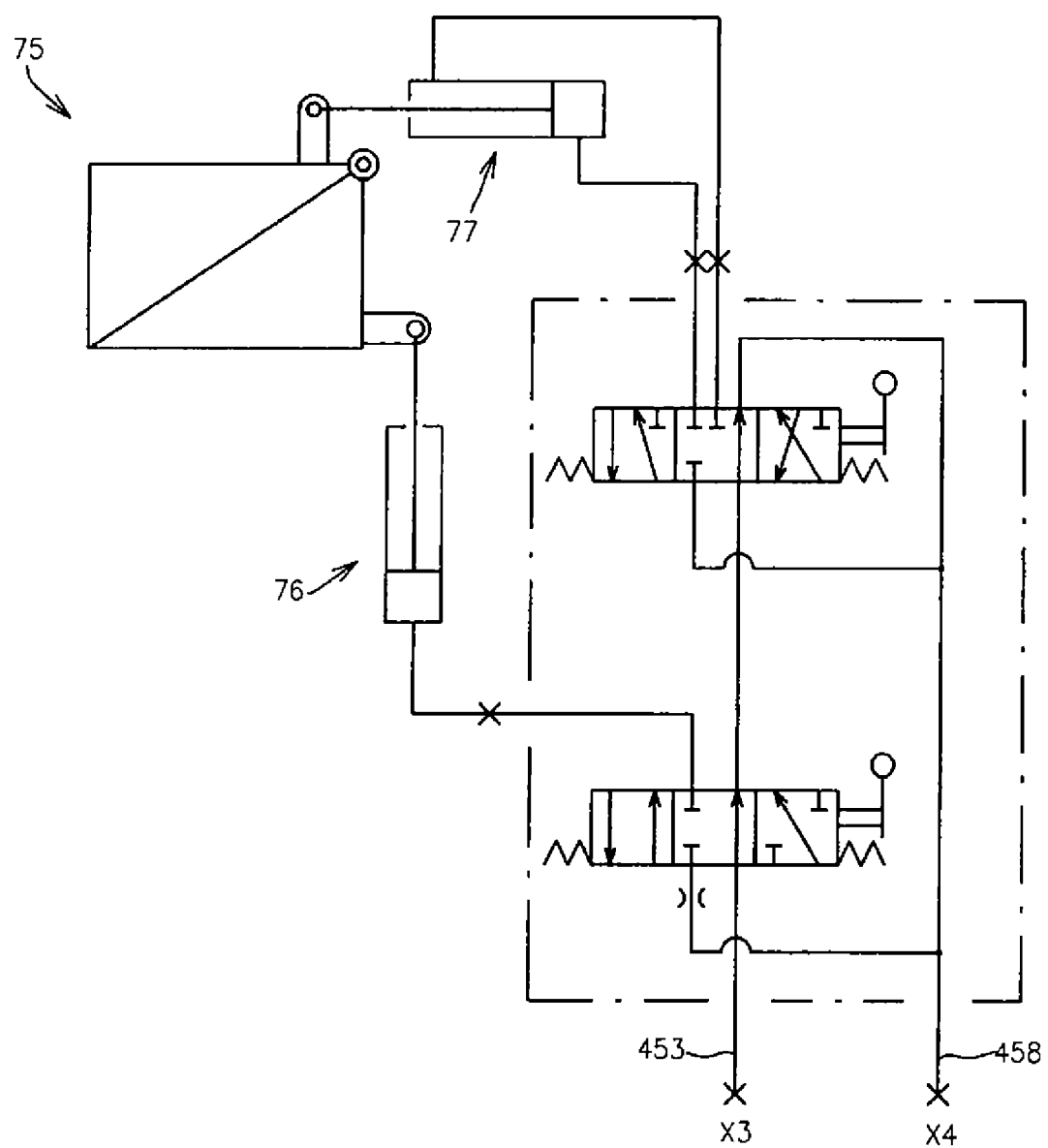
FIG. 13 is a hydraulic circuit diagram of a portion that is fluidly connected to reference characters X3 and X4 in FIG. 3, and shows the hydraulic circuit diagram for driving a hydraulic actuator provided in the working vehicle.

Further, FIG. 13 illustrates a hydraulic circuit diagram of a portion which is fluidly connected to reference numerals X3 and X4 in FIG. 3.

As illustrated in FIG. 12, in the working vehicle 1A, the wheels (the pair of front wheels 40 in the present embodiment) other than the pair of main driving wheels 50(1) and 50(2) are used as sub driving wheels 52 which are hydraulic drive utilizing the hydraulic fluid suctioned/discharged by the hydraulic pump main body 120 of the HST unit 100A.

Specifically, the working vehicle 1A includes, in addition to the aforementioned components, a sub hydraulic motor main body 610 which is fluidly connected to the hydraulic pump main body so as to output rotational power to the sub driving wheels 52.

As illustrated in FIG. 12, in the present embodiment, the sub hydraulic motor main body 610 includes a first sub hydraulic motor main body 610(1) for driving one front wheel 40 which functions as a first sub driving wheel 52(1), and a second sub hydraulic motor main body 610(2) for driving the other front wheel 40 which functions as a second sub driving wheel 52(2).

More specifically, the working vehicle 1A includes the first and second hydraulic motor main bodies 610(1) and 610(2), a sub axle case 620 which accommodates the hydraulic motor main bodies, and a pair of speed-reduction gear units 630 provided at the opposite sides of the sub axle case 620 in the vehicle widthwise direction.

Each speed-reduction gear unit 630 includes a king pin shaft 631 along the vertical direction, a first bevel-gear type speed-reduction gear 632 which is provided on an upper end of the king pin shaft 631 in a relatively non-rotatable manner with respect thereto and is operatively coupled to the corresponding sub hydraulic motor main body 610(1) or 610(2), and a second bevel-gear type speed-reduction gear 633 which is provided on a lower end of the king pin shaft 631 and is operatively coupled to the corresponding sub hydraulic driving wheel 52(1) and 52(2). Further, each speed-reduction gear unit 630 supports the corresponding sub driving wheel 52(1) or 52(2) so as to be steered about the king pin shaft 631.

In the present embodiment, as illustrated in FIG. 3 and FIG. 12, the hydraulic motor main body 140 and the sub hydraulic motor main body 610 including the first and second sub hydraulic motor main bodies 610(1) and 610(2) are fluidly connected in series to the hydraulic pump main body 120 and, also, the first and second sub hydraulic motor main bodies 610(1) and 610(2) are fluidly connected, in parallel, to the hydraulic pump main body 120.

Namely, the sub hydraulic motor main body 610 including the first and second sub hydraulic motor main bodies 610(1) and 610(2) and the hydraulic motor main body 140 of the HST unit 100A are structured to be driven in synchronization with each other with a single hydraulic-pressure source, at a state where the first and second sub hydraulic motor main bodies 610(1) and 610(2) are driven in a differential manner to each other utilizing hydraulic effects.

More specifically, as illustrated in FIG. 3 and FIG. 12, the first HST line 400(1) includes a pump-side first HST line 401(1) having a first end fluidly connected to the hydraulic pump main body 120, a motor-side first HST line 402(1) which is fluidly disconnected from the pump-side first HST line 401(1) and also has a first end fluidly connected to the hydraulic motor main body 140, and a pair of connection lines 405 which fluidly connect the first and second sub hydraulic motor main bodies 610(1) and 610(2) to each other in such a way as to form a closed circuit. The pump-side first HST line 401(1) has a second end fluidly connected to one of the pair of connection lines 405, and the motor-side first HST line 402(1) has a second end fluidly connected to the other one of the pair of connection lines 405.

On the other hand, as illustrated in FIG. 3, the second HST line 400 has a first end fluidly connected to the hydraulic pump main body 120 and a second end fluidly connected to the hydraulic motor main body 140.

The HST unit 100A includes the following structures, in order to enable driving the sub hydraulic motor main body 610 including the first and second sub hydraulic motor main bodies 610(1) and 610(2) and the hydraulic motor main body 140 of the HST unit 100A in a synchronized manner with each other with the single hydraulic pump main body 120.

Figure 14:
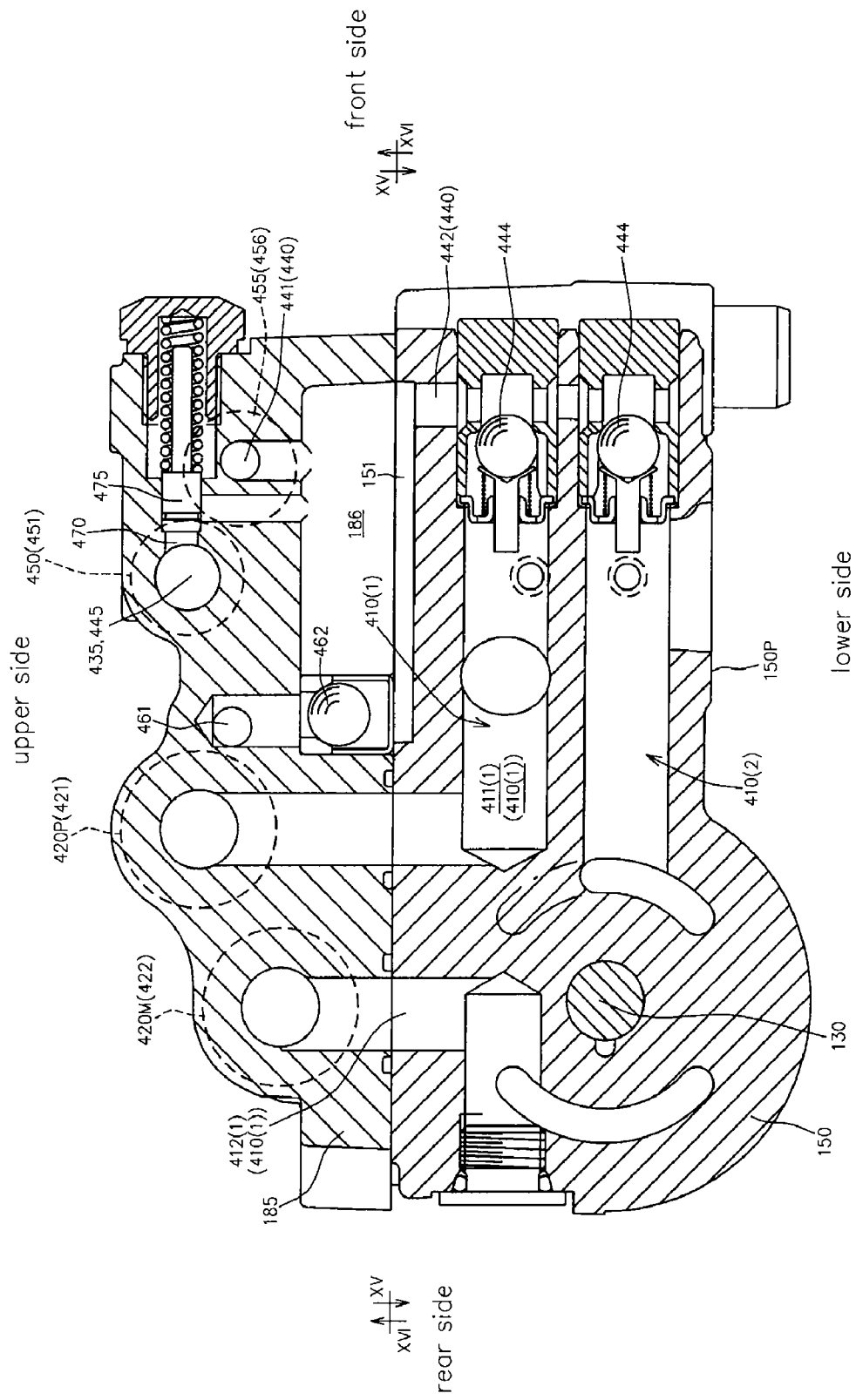
FIG. 14 is a cross-sectional view taken along the line XIV-XIV in FIG. 6, and shows a vertical cross-sectional view of a center section and an auxiliary pump case of the HST unit.

FIG. 14 illustrates a vertical cross-sectional view of the fluid channel block constituted by the center section 150 and the auxiliary pump case 185, taken along the line XIV-XIV in FIG. 6. Further, in FIG. 14, the components are shown with being reversed in the vertical direction for ease of understanding.

Figure 15:
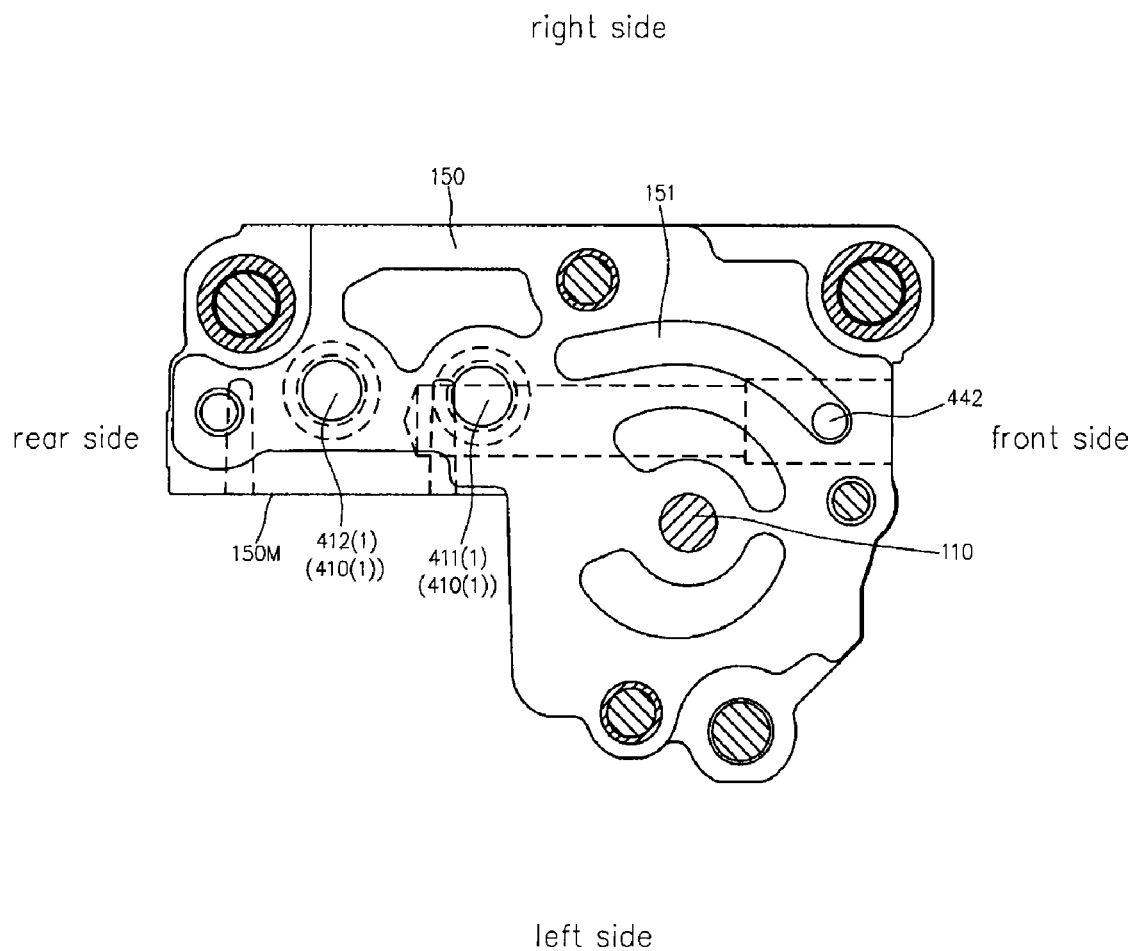
FIG. 15 is an end view of the center section, taken along the line XV-XV in FIG. 14.
Figure 16:
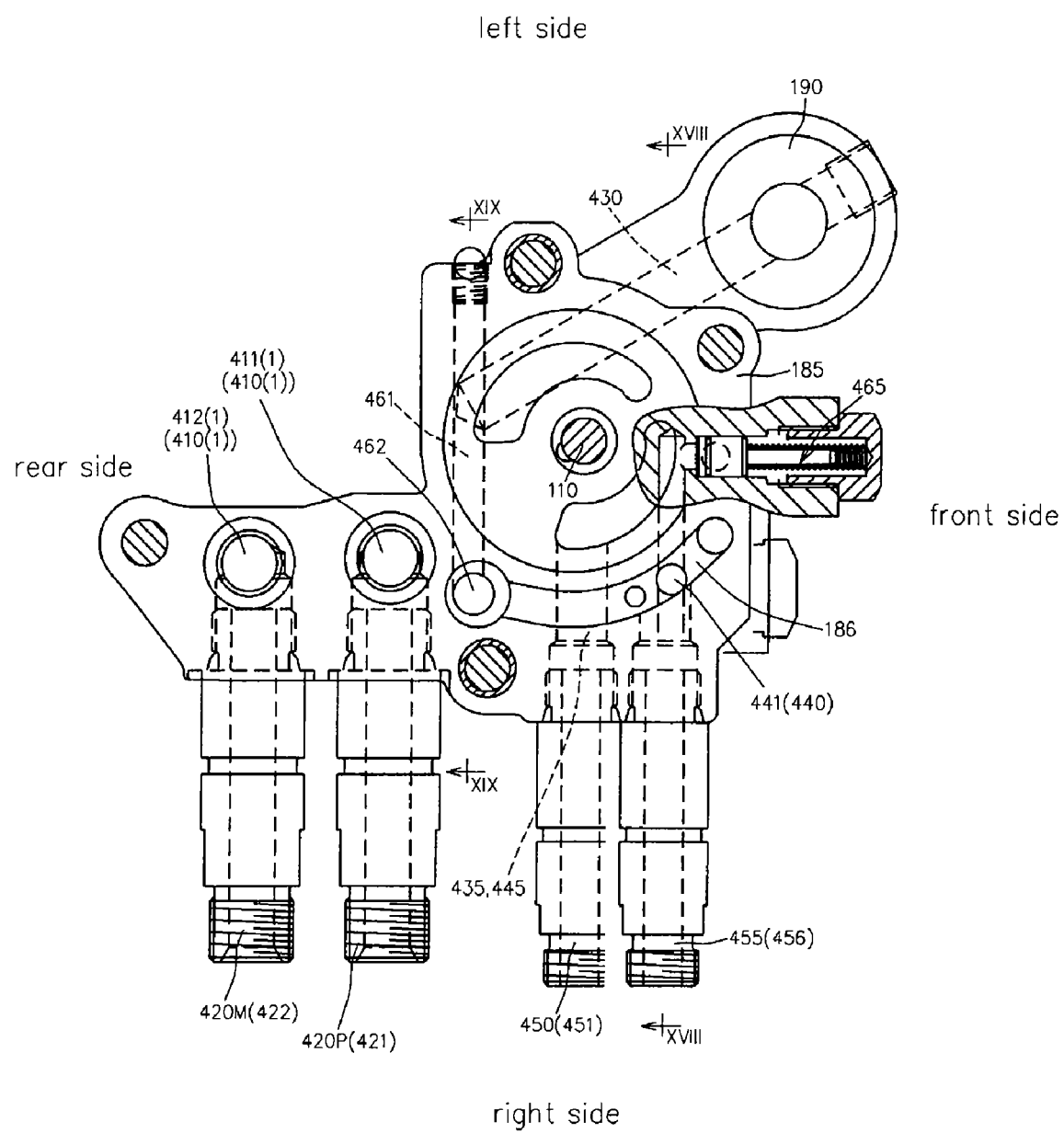
FIG. 16 is an end view of the auxiliary pump case, taken along the line XVI-XVI in FIG. 14.

Further, FIGS. 15 and 16 illustrate end views taken along the line XV-XV and the line XVI-XVI in FIG. 14, respectively.

As illustrated in FIG. 14, in the fluid channel block constituted by the center section 150 and the auxiliary pump case 185, there are formed first and second HST fluid channels 410(1) and 410(2).

The first HST fluid channel 410(1) forms a part of the first HST line 400(1), and the second HST fluid channel 410(2) forms a part of the second HST line 400(2).

As illustrated in FIG. 6 and FIG. 14, the second HST fluid channel 410(2) has a first end which is opened to the pump surface 150P so as to be fluidly connected to the hydraulic pump main body 120 and a second end which is opened to the motor surface 150M so as to be fluidly connected to the hydraulic motor main body 140.

As illustrated in FIG. 14, the first HST fluid channel 410(1) includes a pump-side first HST fluid channel 411(1) which has a first end opened to the pump surface 150P so as to be fluidly connected to the hydraulic pump main body 120 and a second end which is opened to the outside through a pump-side hydraulic fluid port 420P provided in the HST case 200, and a motor-side first HST fluid channel 412(1) which is fluidly disconnected to the pump-side first HST fluid channel 411(1) and which has a first end opened to the motor surface 150M so as to be fluidly connected to the hydraulic motor main body 140 and a second end opened to the outside through a motor-side hydraulic fluid port 420M provided in the HST case 200.

Further, in the present embodiment, the second ends of the pump-side first HST fluid channel 411(1) and the motor-side first HST fluid channel 412(2) are opened at the outer surface of the auxiliary pump case 185.

Further, the second end of the pump-side first HST fluid channel 411(1) is opened to the outside, through a first joint member 421 which forms the pump-side hydraulic-fluid port 420P and is detachably mounted to the HST case 200.

Similarly, the second end of the motor-side first HST fluid channel 412(1) is opened to the outside, through a second joint member 422 which forms the motor-side hydraulic-fluid port 420M and is detachably mounted to the HST case 200.

As illustrated in FIG. 3 and FIG. 12, the pump-side hydraulic-fluid port 420P is fluidly connected to one of the pair of connection lines 405 through a pump-side connection conduit 425P and, also, the motor-side hydraulic-fluid port 420P is fluidly connected to the other one of the pair of connection lines 405 through a motor-side connection conduit 425M.

Namely, in the present embodiment, the pump-side first HST fluid channel 411(1), the pump-side hydraulic-fluid port 420P and the pump-side connection conduit 425P constitute the pump-side first HST line 401(1), while the motor-side first HST fluid channel 412(1), the motor-side hydraulic-fluid port 420M and the motor-side connection conduit 425M constitute the motor-side first HST line 402(1).

As described above, in the HST unit 100A according to the present embodiment, the first HST fluid channel 410(1) formed in the fluid channel block in such a way as to form a part of one (the first HST fluid channel 400(1) in the present embodiment) of the pair of first and second HST lines 400(1) and 400(2) which fluidly connect the hydraulic pump main body 120 and the hydraulic motor main body 140 to each other includes the pump-side first HST fluid channel 411(1) which has the first end fluidly connected to the hydraulic pump main body 120 and the second end opened to the outside through the pump-side hydraulic fluid port 420P, and the motor-side first HST fluid channel 412(1) which has the first end fluidly connected to the hydraulic motor main body 140 and the second end opened to the outside through the motor-side hydraulic fluid port 420M.

With the HST unit 100A having the aforementioned structure, it is possible to easily extract, to the outside, the hydraulic fluid with a hydraulic pressure synchronized with the hydraulic fluid used for driving the hydraulic motor main body 140.

This enables hydraulically driving the sub hydraulic motor main body 410 for driving the sub driving wheels 52(1) and 52(2) at a state where the sub hydraulic motor main body 410 is synchronized with the hydraulic motor main body 140, while driving the main driving wheels 50(1) and 50(2) with the rotational power from the hydraulic motor main body 140. This enables easily providing a four-wheel hydraulic drive structure.

Further, with the HST unit 100A, by fluidly connecting the pump-side hydraulic-fluid port 420P and the motor-side hydraulic-fluid port 42-M directly to each other through an external conduit, it is possible to utilize the hydraulic fluid from the hydraulic pump main body 120 only for driving the hydraulic motor main body 140, thereby easily providing a two-wheel hydraulic drive structure.

Further, in the present embodiment, as described above, the HST unit 100A includes ports (the pump-side hydraulic-fluid port 420P and the motor-side hydraulic-fluid port 420M) which enable fluidly connecting the hydraulic motor main body 140 and the sub hydraulic motor main body 610 in series to the hydraulic pump main body 120. However, instead thereof, the HST unit 100A can be structured to include ports which enable fluidly connecting the hydraulic motor main body 140 and the sub hydraulic motor main body 610 in parallel to the hydraulic pump main body 120.

Figure 17:
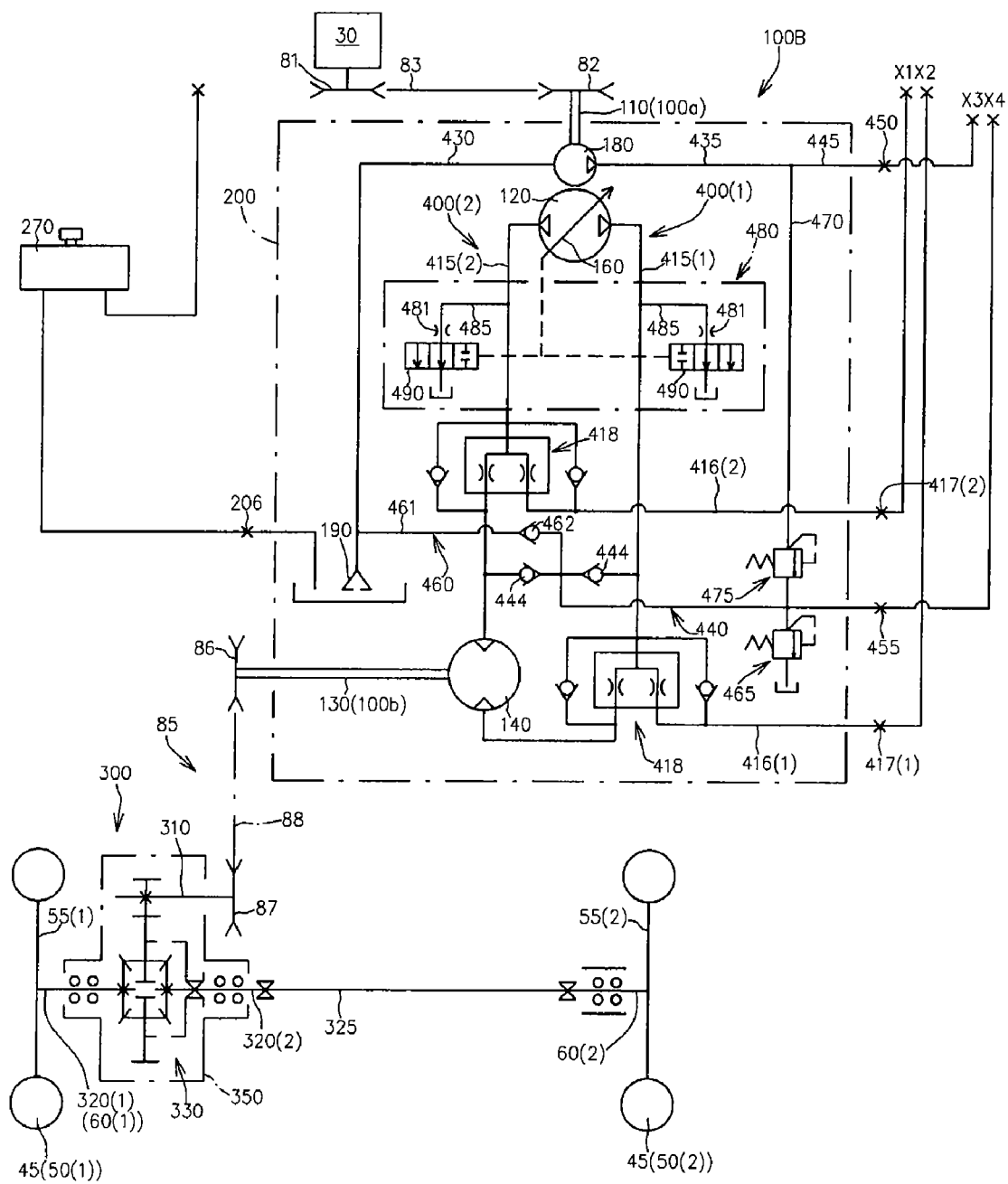
FIG. 17 is a hydraulic circuit diagram of a modified example of the HST unit including ports that allow the hydraulic motor main body of the HST unit and a sub hydraulic motor main body to be fluidly connected in parallel to the hydraulic pump main body of the HST unit.

FIG. 17 illustrates a hydraulic circuit diagram of an HST unit 100B including ports that allow the hydraulic motor main body 140 and the sub hydraulic motor main body 610 to be fluidly connected in parallel to the hydraulic pump main body 120.

The HST unit 100B illustrated in FIG. 17 includes a pair of first and second HST fluid channels 415(1) and 415(2) which has first ends fluidly connected to the hydraulic pump main body 120 and second ends fluidly connected to the hydraulic motor main body 140, a first communication fluid channel 416(1) which has a first end fluidly connected to the first HST fluid channel 415(1), a second communication fluid channel 416(2) which has a first end fluidly connected to the second HST fluid channel 415(2), and a first hydraulic fluid port 417(1) and a second hydraulic fluid port 417(2) which open the first and second communication fluid channels to the outside.

With the HST unit 100B having the aforementioned structure, by fluidly connecting the first and second hydraulic fluid ports 417(1) and 417(2) to one and the other one of a pair of suction/discharge ports of the sub hydraulic motor main body 610, respectively, it is possible to easily provide a four-wheel hydraulic drive structure in which the hydraulic motor main body 140 and the sub hydraulic motor main body 610 are fluidly connected I parallel to the hydraulic pump main body 120.

Further, with the HST unit 100B, by closing the first and second hydraulic fluid ports 417(1) and 417(2) with plugs and the like, it is possible to utilize the hydraulic fluid from the hydraulic pump main body 120 only for driving the hydraulic motor main body 140, thereby easily providing a two-wheel hydraulic drive structure.

As illustrated in FIG. 17, the HST unit 100B is provided with a flow-dividing valve 418 for dividing the hydraulic fluid discharged from the hydraulic pump main body 120 into the hydraulic motor main body 140 and the sub hydraulic motor main body 610, with a predetermined flow-diverting ratio.

By providing the flow-dividing valve 418, it is possible to supply predetermined amounts of the hydraulic fluid to the hydraulic motor main body 140 and the sub hydraulic motor main body 610, regardless of the states of the loads on the pair of main driving wheels 50(1) and 50(2) and the pair of sub driving wheels 52(1) and 52(2).

Further, in the embodiment illustrated in FIG. 17, the flow-dividing valve 418 is provided in both the first HST line 400(1) which has a higher pressure during forward travel and the second HST line 400(2) which has a higher pressure during rearward travel.

Next, the hydraulic circuit for the auxiliary pump main body 180 will be described.

In the present embodiment, the auxiliary pump main body 180 supplies a charge fluid to the pair of HST lines 400(1) and 400(2) and, also, supplies the hydraulic fluid to a hydraulic actuator included in the working vehicle 1A, at a state where the stored fluid in the HST case 200 is used as a fluid source.

More specifically, as illustrated in FIG. 3, the HST unit 100A includes a suction fluid channel 430 from which the auxiliary pump main body 180 suctions the fluid, a discharge fluid channel 435 to which the auxiliary pump main body 180 discharges the fluid, an HST charge fluid channel 440 for supplying the pressurized fluid discharged from the auxiliary pump 180 directly or indirectly to at least one of the pair of HST lines 400(1) and 400(2), and a hydraulic-fluid extraction fluid channel 445 for extracting, to the outside, at least a part of the pressurized fluid discharged from the auxiliary pump main body 180.

In the present embodiment, the various fluid channels are formed in the fluid channel block constituted by the center section 150 and the auxiliary pump case 185 which is coupled to the center section 150 in such a way as to surround the auxiliary pump main body 180.

More specifically, as illustrated in FIG. 7, the suction fluid channel 430 has a first end opened within the HST case 200 to form a suction port 431 and a second end fluidly connected to the suction side of the auxiliary pump main body 180.

In the present embodiment, as illustrated in FIG. 7, the suction fluid channel 430 is formed in the auxiliary pump case 185.

As illustrated in FIG. 7, the suction port 431 is fluidly connected to the internal space in the HST case 200 through the filter 190.

The filter 190 is fluidly connected to the suction port 431 in such a way that at least a part thereof is positioned at a lower area in the internal space in the HST case 200, at a state where the HST unit 100A is mounted in the working vehicle 1A. This prevents the occurrence of exhaustion of the fluid in the auxiliary pump main body 180.

In the present embodiment, as illustrated in FIG. 7, under the state where the HST unit 100A is installed in the working vehicle 1A, the auxiliary pump main body 180 is positioned at an upper area in the internal space in the HST case 200, the suction port 431 is oriented downwardly and, also, the filter 190 has an upper end connected to the suction port 431 and a lower end which reaches to the inner peripheral surface of the bottom wall (the end wall 211 of the first case body 210 in the present embodiment) of the HST case 200.

With this structure, it is possible to effectively prevent the inconvenience of suction of air by the auxiliary pump main body 180.

Further, in the present embodiment, the HST unit 100A includes a reservoir tank 270 which forms a fluid storage space in cooperation with the HST case 200, as illustrated in FIG. 1 and FIG. 3 and the like.

The reservoir tank 270 is supported by the HST case 200 at a state of being fluidly connected to the internal space in the HST case 200 through a communication port 206 (see FIG. 7) provided in the HST case 200.

Preferably, as illustrated in FIG. 7, the communication port 206 is placed so as to open, to the outside, a portion of the internal space in the HST case 200 that is positioned uppermost when the HST unit 100A is installed in the working vehicle 1A and, also, the reservoir tank 270 is placed such that its storage space is positioned above the internal space in the HST case 200.

With this structure, the air contained in the stored fluid in the HST case 200 moves to the reservoir tank 270 through the communication port 206. Accordingly, when the auxiliary pump main body 180 suctions the stored fluid in the HST case 200, it is possible to effectively prevent the inconvenience of suction of air by the auxiliary pump main body 180.

Further, in the present embodiment, as illustrated in FIG. 7, the second end wall 202 the end wall 221 of the second case body 220 in the present embodiment) forming the upper wall of the HST case 200 is inclined so as to be positioned upward as a distance from its one side toward the other side increases, based on the state where the HST unit 100A is installed in the working vehicle 1A. The communication port 206 is positioned near the uppermost portion of the upper wall.

With this structure, it is possible to urge the residue air in the HST case 200 to move to the reservoir tank 270.

The discharge fluid channel 435 has a first end fluidly connected to the discharge side of the auxiliary pump main body 180, as illustrated in FIG. 3.

In the present embodiment, as illustrated in FIG. 4, the discharge fluid channel 435 is formed in the auxiliary pump case 185.

As illustrated in FIG. 3, the HST charge fluid channel 440 has a first end fluidly connected directly or indirectly to the discharge fluid channel 435 and a second end fluidly connected through a check valve 444 to at least one of the pair of HST lines 400(1) and 400(2) (both of the pair of HST lines 400(1) and 400(2) in the present embodiment).

In the present embodiment, as illustrated in FIG. 3, the HST charge fluid channel 440 is structured to supply a returned fluid from the hydraulic actuator included in the working vehicle 1A to the HST fluid channels 410(1) and 410(2).

Figure 18:
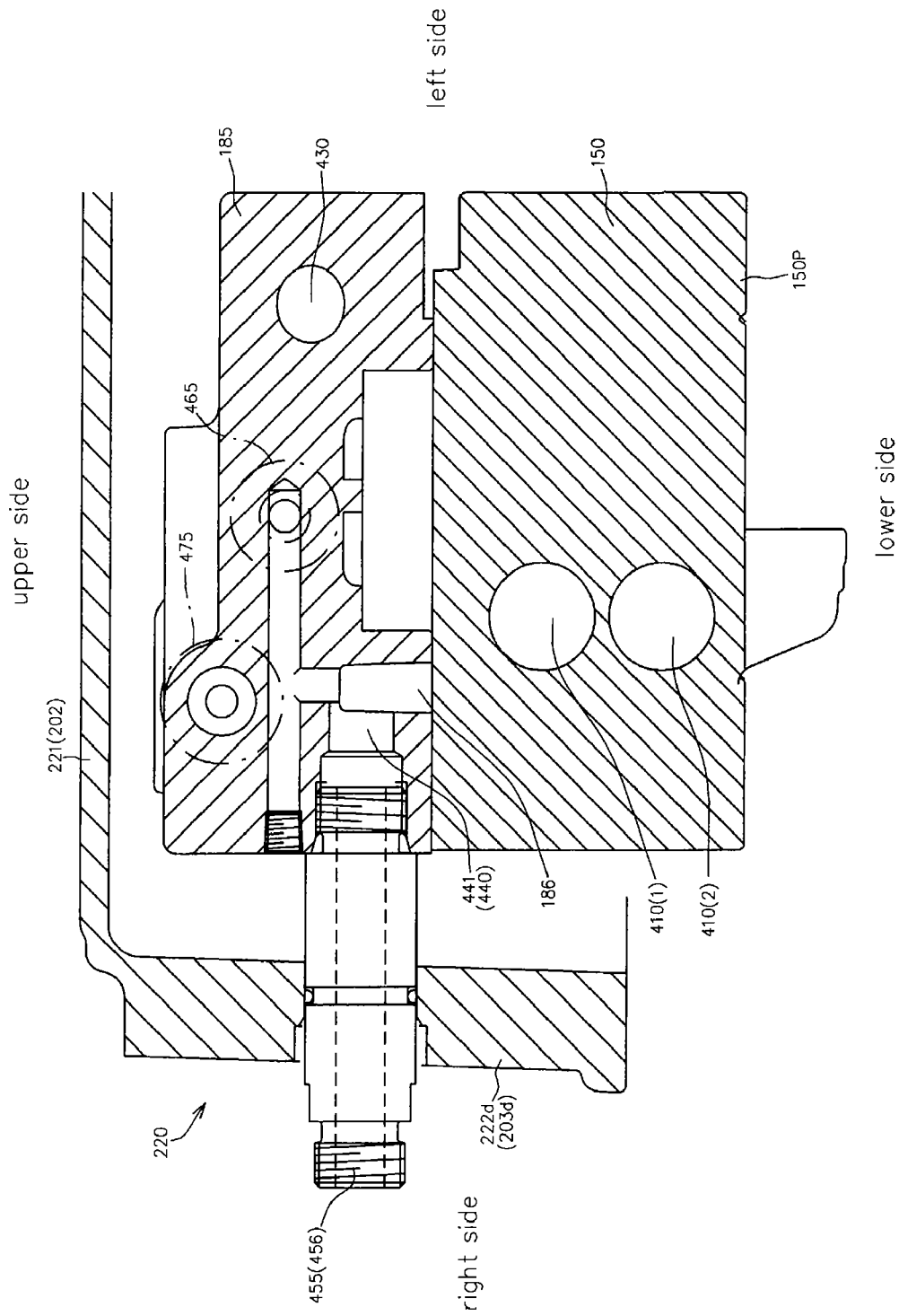
FIG. 18 is a cross-sectional view taken along the line XVIII-XVIII in FIG. 16.
Figure 19:
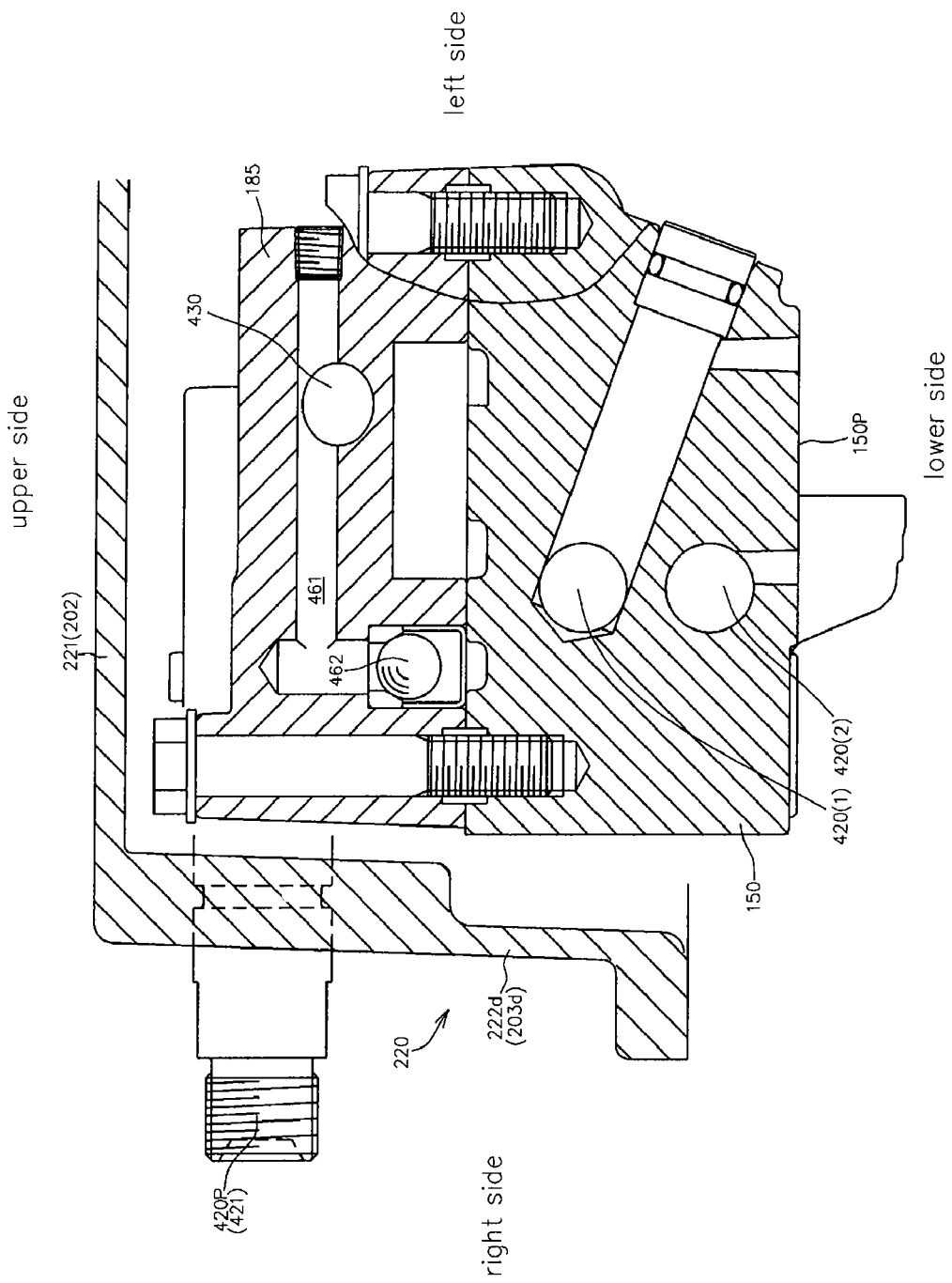
FIG. 19 is a cross-sectional view taken along the line XIX-XIX in FIG. 16.

FIGS. 18 and 19 illustrate cross-sectional views taken along the line XVIII-XVIII and the line XIX-XIX in FIG. 16, respectively. Further, in FIG. 18 and FIG. 19, the components are shown with being reversed in the vertical direction for ease of understanding.

As illustrated in FIG. 3, FIG. 18 and the like, the HST case 200 is provided with a hydraulic-fluid extraction port 450 for extracting the hydraulic fluid in the hydraulic-fluid extraction fluid channel 445 to the outside, and a hydraulic-fluid return port 455 for receiving a returned fluid which is returned thereto after being supplied to the hydraulic actuator through the hydraulic-fluid extraction port 450 and supplying the same to the HST charge fluid channel 440.

Further, in the present embodiment, as illustrated in FIG. 16 and the like, the hydraulic-fluid extraction port 450 and the hydraulic-fluid return port 455 are embodied by a third joint member 451 and a fourth joint member 456 which are detachably mounted to the HST case 200, respectively.

Further, the HST charge fluid channel 440 has the first end fluidly connected to the hydraulic-fluid return port 455 and the second end fluidly connected to both the pair of HST fluid channels 410(1) and 410(2) through the pair of check valves 444, as illustrated in FIG. 14, FIG. 16 and FIG. 18.

In the present embodiment, the HST charge fluid channel 440 includes an auxiliary-pump-case side charge fluid channel 441 formed in the auxiliary pump case 185 and a center-section side charge fluid channel 442 formed in the center section 150.

The auxiliary-pump-case side charge fluid channel 441 has a first end opened at the outer surface of the auxiliary pump case 185 so as to be fluidly connected to the hydraulic-fluid return port 455 and a second end opened at the surface of the auxiliary pump case 185 which is brought into contact with the center section 150, as illustrated in FIG. 14, FIG. 16 and FIG. 18.

Further, as illustrated in FIG. 14, FIG. 16 and FIG. 18, the surface of the auxiliary pump case 185 which is brought into contact with the center section 150 is formed with an auxiliary-pump-case side groove 186, and the second end of the auxiliary-pump-case side charge fluid channel 441 is opened within the groove 186.

As illustrated in FIG. 14 and FIG. 15, the center-section side charge fluid channel 442 has a first end opened to a surface of the center section 150 which is brought into contact with the auxiliary pump case 185 so as to be fluidly connected to the auxiliary-pump-case side charge fluid channel 441 and a second end fluidly connected to the pair of HST fluid channels 410(1) and 410(2) through the pair of check valves 444.

Further, as illustrated in FIG. 14 and FIG. 15, the surface of the center section 150 which is brought into contact with the auxiliary pump case 185 is formed with a center-section side groove 151, and the first end of the center-section side charge fluid channel 442 is opened within the groove 151.

In the present embodiment, as illustrated in FIG. 3, the HST unit 100A includes, in addition to the HST charge fluid channel 440, a self-suction line 460 which, in the event that a negative pressure is created in one of the pair of HST lines 400(1) and 400(2), enables the HST line being subjected to this negative pressure to suck the stored fluid in the HST case 200.

By providing this self-suction line 460, it is possible to effectively prevent the occurrence of free wheel phenomena.

Namely, when the working vehicle is stopped on a slope or the like with the driving power source 30 being stopped, the rotational power from the main driving wheels 50(1) and 50(2) are applied to the motor shaft 130 which is operatively coupled to the main driving wheels 50(1) and 50(2), so that the hydraulic motor main body 140 makes an attempt to exert pumping function.

In this case, when the pair of HST line 400(1) and 400(2) are filled with the hydraulic fluid, this hydraulic fluid applies a braking force to the hydraulic motor main body 140, while the pumping function of the hydraulic motor main body 140 creates a higher pressure in one of the HST lines 400(1) and 400(2), which may cause a leakage of the hydraulic fluid from the HST line being subjected to the higher pressure.

In the event of the occurrence of such a leakage of the hydraulic fluid, the fluid is circulated from the HST line being subjected to the negative pressure to the HST line being subjected to the higher pressure, which facilitates the leakage of the hydraulic fluid from the HST line being subjected to the higher pressure. Further, finally, the hydraulic fluid in the pair of HST lines 400(1) and 400(2) is exhausted, which causes the main driving wheels 50(1) and 50(2) to start freely rotating (a free wheel phenomenon). This may cause the working vehicle 1A to descend the slope.

More specifically, as illustrated in FIG. 3, the self-suction line 460 includes a self-suction fluid channel 461 which has a first end fluidly connected to the internal space in the HST case 200 and a second end fluidly connected to a portion of the HST charge fluid channel 440 that is positioned on an upstream side of the pair of check valves 444 in the flow direction of the charge fluid, and a self-suction check valve 462 which allows the fluid to flow in the self-suction fluid channel 461 from the first end to the second end while preventing a revised flow.

In the present embodiment, as illustrated in FIG. 14 and FIG. 16, the self-suction fluid channel 461 is formed in the auxiliary pump case 185, such that its first end is fluidly connected to the suction fluid channel 430 and the second end is fluidly connected to a portion of the HST charge fluid channel 440 that is positioned on an upstream side of the pair of check valves 444 in the flow direction of the charge fluid.

Further, the self-suction check valve 462 is mounted in the auxiliary pump case 185 so as to be inserted in the self-suction fluid channel 461.

By providing the self-suction line 460, in the event that a negative pressure is created in one of the pair of HST lines 400(1) and 400(2), the stored fluid is flowed from the internal space in the HST case 200 to the HST line being subjected to this negative pressure, which can effectively prevent the occurrence of the free wheel phenomenon.

The hydraulic-fluid extraction fluid channel 445 has a first end fluidly connected to the discharge fluid channel 435 and a second end fluidly connected to the fluid-channel extraction port 450.

The hydraulic fluid extracted from the hydraulic-fluid extraction port 450 is supplied to the hydraulic actuator through a hydraulic-fluid supply conduit 453, as illustrated in FIG. 3 and FIG. 13.

Further, the returned fluid from the hydraulic actuator is supplied to the hydraulic-fluid return port 455 through a hydraulic-fluid return conduit 458.

Further, in the present embodiment, as illustrated in FIG. 13, the hydraulic actuator includes a hydraulic lifting device 76 for lifting up and down the grass collector 75 provided in the working vehicle 1A, and a hydraulic dumping device 77 for opening and closing the grass collector 75.

The HST unit 100A further includes a charge relief valve 465 for setting the hydraulic pressure in the HST charge fluid channel 440, as illustrated in FIG. 3.

The charge relief valve 465 is mounted in the fluid channel block in a state of having a primary side fluidly connected to the HST charge fluid channel 440.

In the present embodiment, as illustrated in FIG. 16 and FIG. 18, the charge relief valve 465 is mounted in the auxiliary pump case 185, and the relief fluid from the charge relief valve 465 is drained into the inside of the HST case 200.

The HST unit 100A further includes a hydraulic-fluid pressure setting mechanism for setting the hydraulic pressure in the hydraulic-fluid extraction fluid channel 445.

As illustrated in FIG. 3 and FIG. 14, the hydraulic-fluid pressure setting mechanism includes a hydraulic-fluid pressure setting fluid channel 470 formed in the fluid channel block so as to have a first end fluidly connected to the discharge fluid channel 435 or the hydraulic-fluid extraction fluid channel 445, and a hydraulic-fluid relief valve 475 inserted in the hydraulic-fluid pressure setting fluid channel 470 so as to have a primary side fluidly connected to the discharge fluid channel 435 or the hydraulic-fluid pressure extraction fluid channel 445.

In the present embodiment, the hydraulic-fluid pressure setting fluid channel 470 is formed in the auxiliary pump case 185, as illustrated in FIG. 14.

Preferably, as illustrated in FIG. 3, the hydraulic-fluid relief valve 475 has a secondary side fluidly connected to the HST charge fluid channel 440.

By providing this structure, it is possible to effectively utilize the relief fluid from the hydraulic-fluid relief valve 475 as a part of the charge fluid to be supplied to the HST lines 400(1) and 400(2).

In the present embodiment, as illustrated in FIG. 14, the hydraulic-fluid pressure setting fluid channel 470 has a second end fluidly connected to the auxiliary-pump-case side groove 186, so that the relief fluid from the hydraulic-fluid relief valve 475 is supplied to the HST charge fluid channel 440.

Further, the HST unit 100A includes an internal damping mechanism 480 for preventing the occurrence of a sudden hydraulic-pressure change in one HST line of the pair of HST lines 400(1) and 400(2) that is subjected to a lower pressure when returning the movable swash plate 161 from a slanting position to the neutral position, while preventing degradation of the transmission efficiency in an output state where the movable swash plate 161 is slanted from the neutral position so that the motor shaft 130 is driven to rotate.

The internal damping mechanism 480 includes a pair of damping fluid channels 485 which are fluidly connected to the pair of HST lines 400(1) and 400(2) with throttles 481 being inserted therebetween, and a pair of switching valves 490 for closing or opening the pair of damping fluid channels 485 according to the slanting position of the movable swash plate 161, as illustrated in FIG. 3.

More specifically, the HST unit 100A includes a damping arm 495 which is supported on the control shaft 162 in a relatively non-rotatable manner with respect thereto in a state of facing the center section 150 within the HST case 200, as illustrated in FIG. 4 and FIG. 7.

In the present embodiment, as illustrated in FIG. 4, the damping arm 495 is formed integrally with the crank arm 163 which couples the control shaft 162 and the movable swash plate 161 to each other.

As illustrated in FIG. 4, the damping fluid channels 485 have first ends fluidly connected to the corresponding HST fluid channels 410(1) and 410(2) and second ends opened at the outer surface of the center section 150 so as to be faced to the damping arm 495.

Throttle valves 482 provided with the throttles 481 are inserted in opened ends of the damping fluid channels 485, and the throttle valves 482 are pushed to the damping arm 495 through springs.

The damping arm 495 is formed with fluid grooves 496 for selectively closing or opening the second ends of the damping fluid channels 485, according to the position of the control shaft 162 about the axis line (namely, the slanting position of the movable swash plate 161), as illustrated in FIG. 7.

More specifically, the fluid grooves 496 are structured so as to open both the pair of damping fluid channels 485 to the internal space in the HST case 200 when the movable swash plate 161 is positioned at the neutral position, and close the second end of one of the pair of damping fluid channels 485 that is fluidly connected to the one HST line being subjected to a higher pressure while opening the second end of the other one damping fluid channel fluidly connected to the other HST line being subjected to a lower pressure to the internal space in the HST case 200 when the movable swash plate 161 is slanted in either one direction from the neutral position about the slant axis line.

Further, instead of the internal damping mechanism 480, it is also possible to provide a shock absorber 500 for preventing the movable swash plate 161 from suddenly slanting about the slant axis line, which can prevent the occurrence of a sudden hydraulic-pressure change in the pair of HST lines 400(1) and 400(2).

Figure 20:
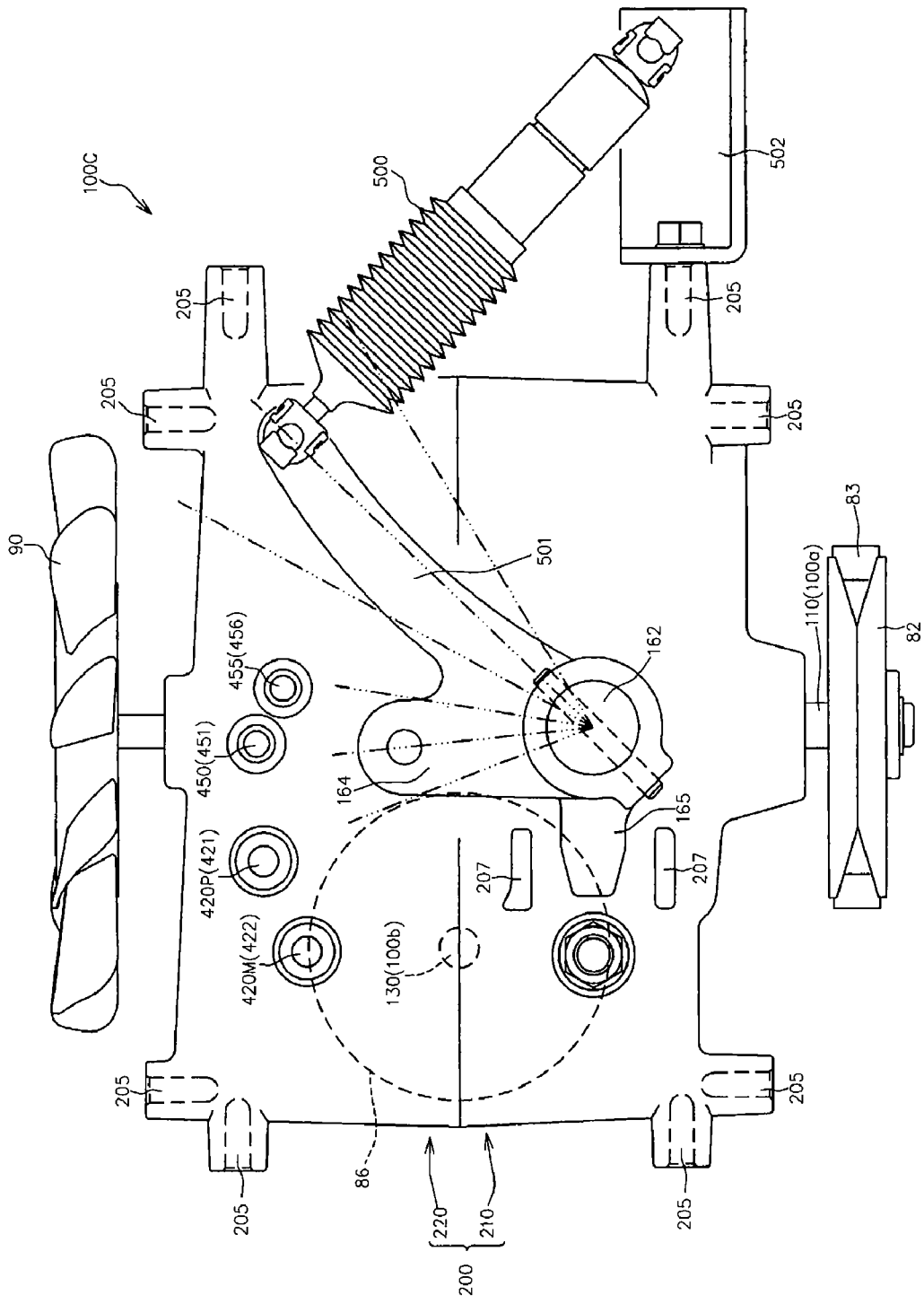
FIG. 20 is an end view of another modified example of the HST unit that includes a shock absorber.

FIG. 20 illustrates an end view of a HST unit 100C including the shock absorber 500.

In the HST unit 100C, a coupling arm 501 is supported on the outer end of the control shaft 162 in a relatively non-rotatable manner with respect thereto.

Further, the shock absorber 500 has a first end that is fixedly supported and a second end coupled to a free end of the coupling arm 501.

In the embodiment illustrated in FIG. 20, the coupling arm 501 is formed integrally with the control arm 164. Further, a mounting stay 502 is connected to the HST case 200 using one of the mounting bosses 205, and one end of the shock absorber 500 is coupled to the mounting stay 502.

Second Embodiment

Another embodiment of the HST unit according to the present invention will now be described with reference to the accompanying drawing.

Figure 21:
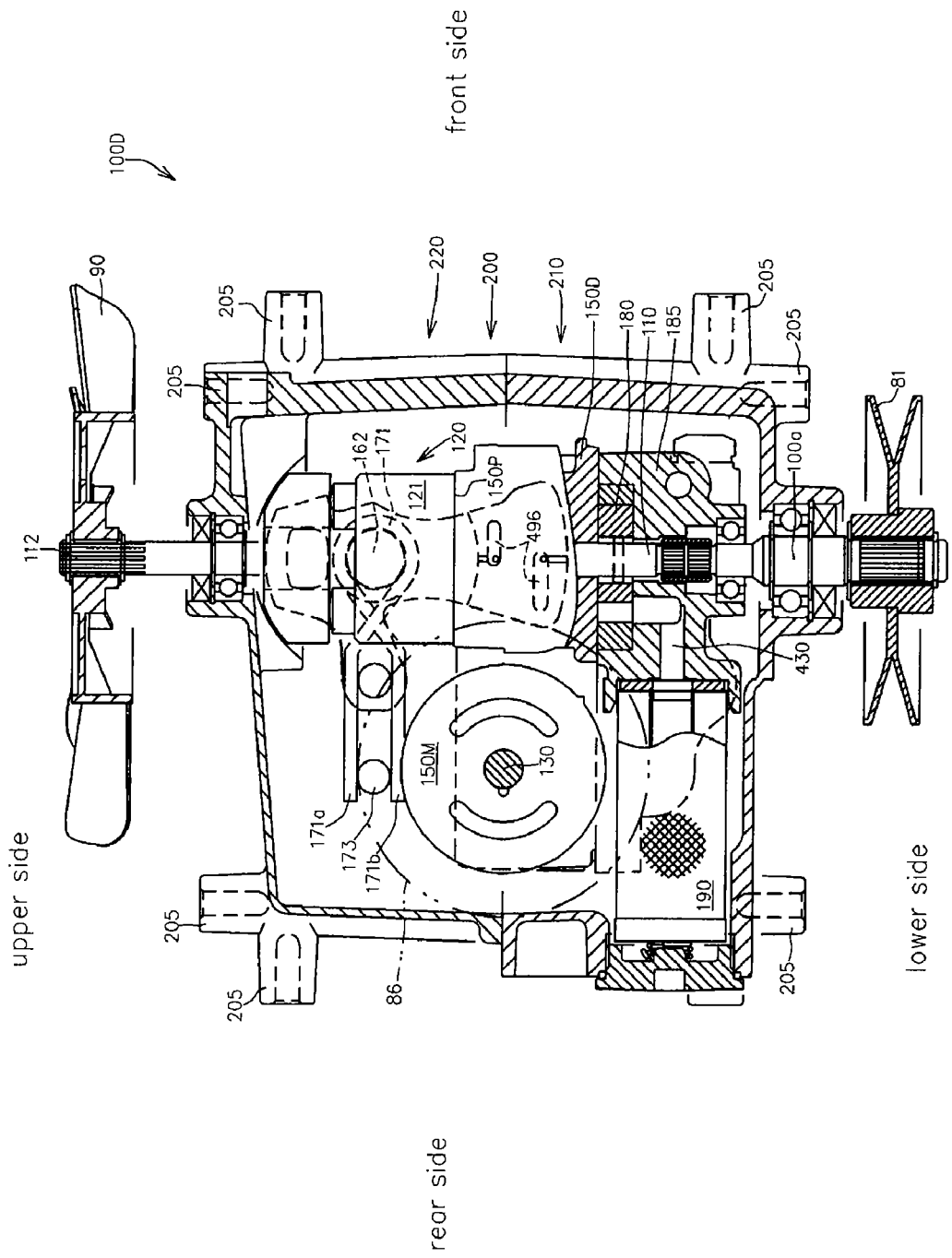
FIG. 21 is a vertical cross-sectional view of another embodiment of the HST unit according to the present invention.

FIG. 21 illustrates a vertical cross-sectional view of an HST unit 100D according to the present embodiment.

In the drawing, the same reference numerals are denoted for the same components as those of the first embodiment to omit the detailed explanation thereof.

As shown in FIG. 21, the HST unit 100D is different from the HST unit 100A in the first embodiment, in that the positions where the hydraulic pump main body 120 and the auxiliary pump main body 180 are mounted are changed.

Specifically, in the present embodiment, with the state, as a reference, where the HST unit 100D is mounted at the working vehicle 1A, the hydraulic pump main body 120 and the auxiliary pump main body 180 is positioned on the upper surface and the lower surface of a center section 150D, respectively.

More specifically, the HST unit 100D includes the center section 150D in place of the center section 150, in comparison with the HST unit 100A according to the first embodiment.

The center section 150D is configured so that the motor surface 150M faces in the vehicle widthwise direction and the pump surface 150P faces upward, with the state, as a reference, where the HST unit 100D is mounted at the working vehicle 1A.

The auxiliary pump main body 180 is mounted at the lower surface of the center section 150D in a state of being rotationally driven by the pump shaft 110, and the auxiliary pump case 185 is connected to the lower surface of the center section 150D so as to surround the auxiliary pump main body 180.

In the configuration, the filter 190 is connected to the auxiliary pump case 185 with extending in a substantially horizontal direction so as to position at a lower region of the internal space in the HST case 200 when the HST unit 100D is mounted at the working vehicle 1A.

In the HST unit 100D according to the present embodiment, the pump shaft 100 and the HST input shaft 100a are separate from each other.

Specifically, the HST input shaft 100a is supported by the HST case 200 in a rotatable manner around its axis line so as to extend in a substantially vertical direction in a state of having a first end that extends outwards, as shown in FIG. 21.

The pump shaft 110 is positioned coaxially with the HST input shaft 100a and is connected to the same in a relatively non-rotatable manner with respect thereto.

Third Embodiment

Still another embodiment of the HST unit according to the present invention will now be described with reference to the accompanying drawing.

Figure 22:
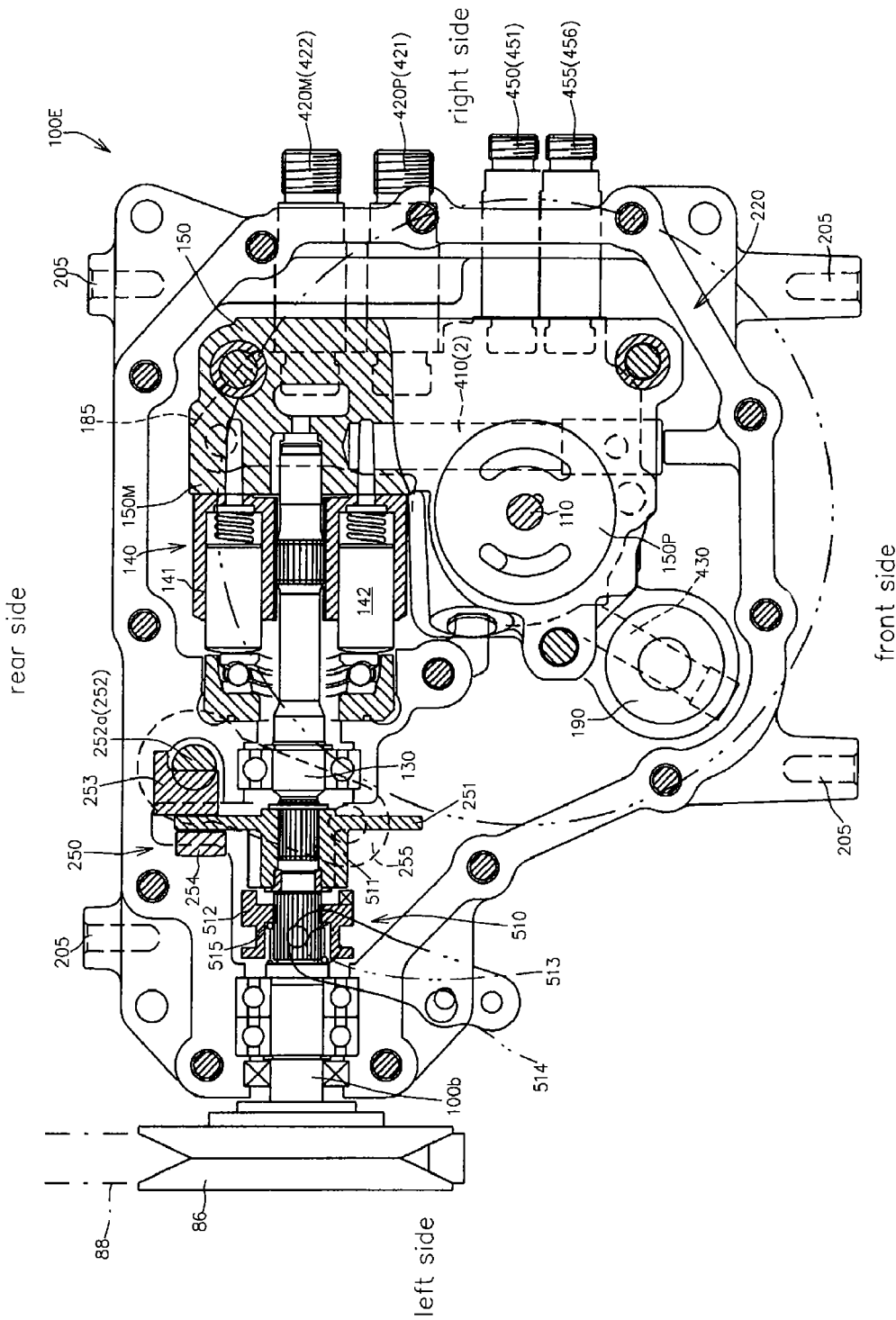
FIG. 22 is a horizontal cross-sectional view of still another embodiment of the HST unit according to the present invention.

FIG. 22 illustrates a horizontal cross-sectional view of an HST unit 100E according to the present embodiment.

In the drawing, the same reference numerals are denoted for the same components as those of the first and second embodiments to omit the detailed explanation thereof.

The HST unit 100E according to the present embodiment further includes a mechanical clutch mechanism 510 capable of being manually operated, in comparison with the HST unit in the first embodiment.

In the first embodiment, the motor shaft 130 has the first end 131 extending outward from the HST case 200 so that the motor shaft 130 functions as the HST output shaft 100b.

Instead of this configuration, in the HST unit 100E according to the present embodiment, the motor shaft 130 is entirely accommodated within the HST case 200, and there is further provided an HST output shaft 100b that is separate from the motor shaft 130, the HST output shaft 100b being supported by the HST case 200 in a rotatable manner about its axis line in a state of being positioned coaxially with the motor shaft 130 and having a first end extended outward from the HST case 200, as shown in FIG. 22.

The clutch mechanism 510 includes a driving-side member 511 supported by the motor shaft 130 in a relatively non-rotatable manner with respect thereto, a driven-side member 512 supported by the HST output shaft 100b in a relatively non-rotatable manner and in a movable manner in the axis line with respect thereto, and a clutch operating shaft 513 that is supported by the HST case 200 so as to be rotated about its axis line in accordance with an operation from outside and is operatively connected to the driven-side member 512 so as to move the driven-side member 512 in the axis line of the HST output shaft 100b in response to its own rotation about the axis line, as shown in FIG. 22.

A reference numeral 514 in FIG. 22 designates a clutch operation arm that is supported by an outer end portion of the clutch operation shaft 513 in a relatively non-rotatable manner with respect thereto and is operatively connected through a suitable link member to a clutch operation member provided in the vicinity of the driver's seat 20.

The driven-side member 512 is selectively engaged with the driving-side member 511 through a concavo-convex structure, in accordance with its position along the axis line of the HST output shaft 100b.

Specifically, the driving-side member 511 is formed with one of a concave portion and a convex portion at a surface facing to the driven-side member 512, and the driven-side member 512 is formed with the other one of the concave portion and the convex portion at a surface facing to the driving-side member 511.

With the configuration, when the driven-side member 512 is moved toward the driving-side member 511 along the axis line of the HST output shaft 100b by the clutch operation shaft 513, the driving-side member 511 and the driven-side member 512 are connected to each other in a relatively non-rotatable manner around the axis line.

In the present embodiment, the clutch mechanism 510 includes a biasing member 515 that presses the driven-side member 512 toward the driving-side member 511, and is configured so that the driving-side member 511 and the driven-side member 512 are connected to each other in a relatively non-rotatable manner at a normal state when no manual operation is applied.

According to the HST unit 100E having the configuration, it is possible to effectively prevent an occurrence of a pressure difference between the pair of HST lines 400(1) and 400(2) when the working vehicle 1A is forcibly towed in the event of a failure of the driving power source 30 or the HST and the like so that the hydraulic motor main body 140 is rotated in response to the rotation of the first and second driving wheels 50(1) and 50(2), without interrupting the power transmission between the HST output shaft 100b and the axle input shaft 310 by the tension pulley 89.

Fourth Embodiment

Still another embodiment of the HST unit according to the present invention will now be described with reference to the accompanying drawing.

Figure 23:
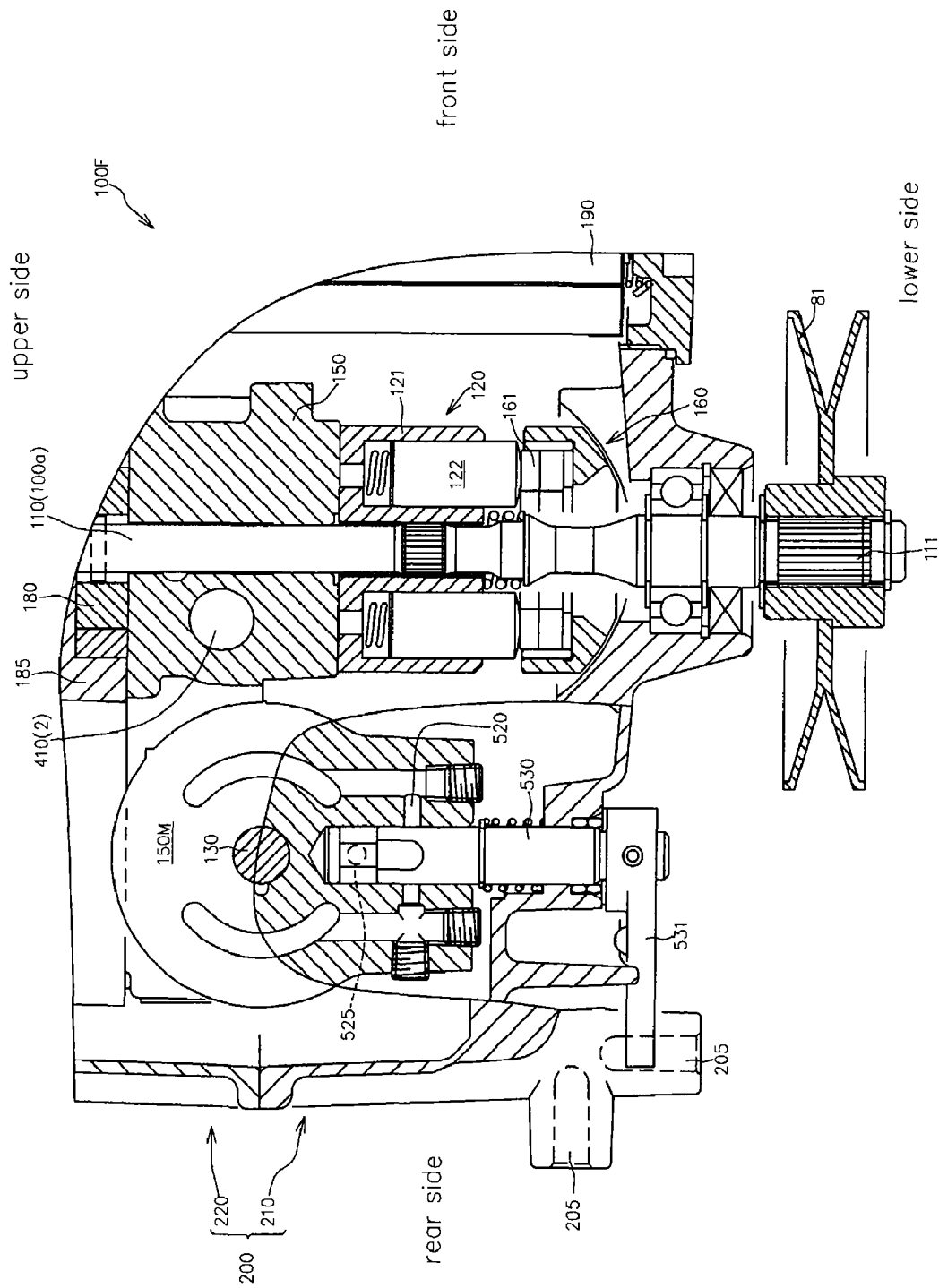
FIG. 23 is a vertical cross-sectional view of still another embodiment of the HST unit according to the present invention.

FIG. 23 illustrates a vertical cross-sectional view of an HST unit 100F according to the present embodiment.

In the drawing, the same reference numerals are denoted for the same components as those of the first to third embodiments to omit the detailed explanation thereof.

The HST unit 100F according to the present embodiment further includes a bypass fluid channel 520 fluidly connecting the pair of HST lines 400(1), 400(2), a drain fluid channel 525 having a first end opened to the internal oil sump of the HST case 200, and a bypass valve 530 supported by the HST case 200 in a rotatable manner around its axis line in a state of being interposed in the bypass fluid channel 520.

A reference numeral 531 in FIG. 23 designates a bypass operation arm that is supported by an outer end portion of the bypass valve 530 in a relatively non-rotatable manner with respect thereto and is operatively connected through a suitable link mechanism to a bypass operation member provided in the vicinity of the driver's seat 20.

The bypass valve 530 is configured so as to take a cutoff position of having the bypass fluid channel 520 shut off and fluidly disconnecting the drain fluid channel 525 to the bypass fluid channel 520 and a communication position of having the bypass fluid channel communicated and fluidly connecting the drain fluid channel 525 to the bypass fluid channel 520, by being operated to be rotated around its axis line.

According to the HST unit 100F having the configuration, it is possible to effectively prevent an occurrence of a pressure difference between the pair of HST lines 400(1) and 400(2) when the working vehicle 1A is forcibly towed in the event of a failure of the driving power source 30 or the HST and the like so that the hydraulic motor main body 140 is rotated in response to the rotation of the first and second driving wheels 50(1) and 50(2), without interrupting the power transmission between the HST output shaft 100b and the axle input shaft 310 by the tension pulley 89.

Further, in the present embodiment, the bypass valve 530 has a drain function in addition to a bypass function in which the bypass valve 530 selectively communicates or shuts off between the pair of HST lines 400(1), 400(2), as described above. Accordingly, it is possible to quickly take out air from the pair of HST lines 400(1), 400(2) using the bypass valve 530. It is needed to take out air from the pair of HST lines, for example, at the time of filling the pair of HST lines with operation fluid or the like.

Fifth Embodiment

Still another embodiment of the HST unit according to the present invention will now be described with reference to the accompanying drawing.

Figure 24:
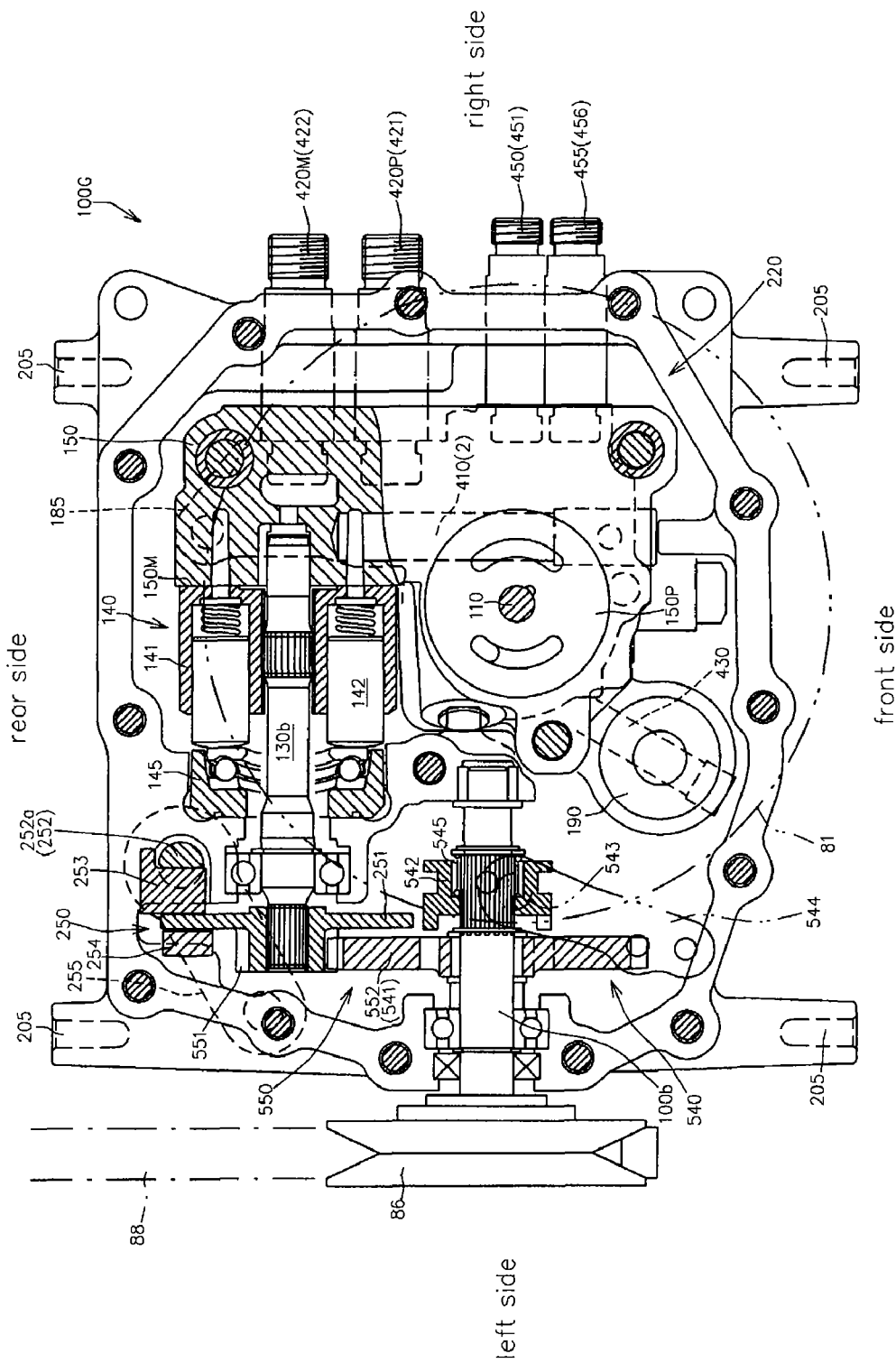
FIG. 24 is a horizontal cross-sectional view of still another embodiment of the HST unit according to the present invention.

FIG. 24 illustrates a horizontal cross-sectional view of an HST unit 100G according to the present embodiment.

In the drawing, the same reference numerals are denoted for the same components as those of the first to fourth embodiments to omit the detailed explanation thereof.

The HST unit 100G according to the present embodiment further includes a mechanical clutch mechanism 540 and a speed-reduction gear train 550, in comparison with the HST unit 100A in the first embodiment, as shown in FIG. 24.

Specifically, in the first embodiment, the motor shaft 130 has the first end 131 extending outward from the HST case 200 so that the motor shaft 130 functions as the HST output shaft 100b.

On the other hand, in the HST unit 100G according to the present embodiment, the motor shaft 130 is entirely accommodated within the HST case 200, and there is further provided an HST output shaft 100b that is separate from the motor shaft 130, as shown in FIG. 24.

The HST output shaft 100b is disposed in substantially parallel with the motor shaft 130 at a position displaced from the motor shaft 130 and is supported by the HST case 200 in a rotatable manner around its axis line in a state of having a first end extended outward from the HST case 200.

As shown in FIG. 24, the speed-reduction gear train 550 includes a driving-side gear 551 supported by the motor shaft 130 in a relatively non-rotatable manner with respect thereto, and a driven-side gear 552 that has a diameter larger than the driving-side gear 551 and is supported by the HST output shaft 100b in a state of being engaged with the driving-side gear 551.

In the present embodiment, the driving-side gear 551 is integrally formed with the brake disk 251.

The clutch mechanism 540 is configured so as to selectively engage or release the power transmission from the driven-side gear 552 to the HST output shaft 100b in response to an operation from outside.

In the present embodiment, the driven-side gear 552 is supported by the HST output shaft 100b in a relatively rotatable manner with respect thereto, and functions as a driving-side member 541 of the clutch mechanism 540.

Specifically, the clutch mechanism 540 includes the driving-side member 541 (the driven-side side gear 552 in the present embodiment) supported by the HST output shaft 100b in a relatively rotatable manner with respect thereto in a state of being operatively connected to the motor shaft 130, a driven-side member 542 supported by the HST output shaft 100b in a relatively non-rotatable manner and in a movable manner along the axis line with respect thereto, and a clutch operation shaft 543 that is supported by the HST case 200 so as to be rotated around its axis line in accordance with an operation from outside and is operatively connected to the driven-side member 542 so as to move the driven-side member 542 along the axis line of the HST output shaft 100b in response to its own rotation around the axis line.

A reference numeral 544 in FIG. 24 designates a clutch operation arm that is supported by an outer end portion of the clutch operation shaft 543 and is operatively connected through a suitable link member to a clutch operation member provided in the vicinity of the driver's seat 20.

The driven-side member 542 is selectively engaged with the driving-side member 541 through a concavo-convex structure, in accordance with its position along the axis line of the HST output shaft 100b.

Specifically, the driving-side member 541 is formed with one of a concave portion and a convex portion at a surface facing to the driven-side member 542, and the driven-side member 542 is formed with the other one of the concave portion and the convex portion at a surface facing to the driving-side member 541.

With the configuration, when the driven-side member 542 is moved toward the driving-side member 541 along the axis line of the HST output shaft 100b by the clutch operation shaft 543, the driving-side member 541 and the driven-side member 542 are connected to each other in a relatively non-rotatable manner around the axis line.

In the present embodiment, the clutch mechanism 540 includes a biasing member 545 that presses the driven-side member 542 toward the driving-side member 541, and is configured so that the driving-side member 541 and the driven-side member 542 are connected to each other in a relatively non-rotatable manner at a normal state when no manual operation is applied.

According to the HST unit 100G having the configuration, it is possible to effectively prevent an occurrence of a pressure difference between the pair of HST lines 400(1) and 400(2) when the working vehicle 1A is forcibly towed in the event of a failure of the driving power source 30 or the HST and the like so that the hydraulic motor main body 140 is rotated in response to the rotation of the first and second driving wheels 50(1) and 50(2), without interrupting the power transmission between the HST output shaft 100b and the axle input shaft 310 by the tension pulley 89.

Further, the HST unit 100G makes it possible to achieve a miniaturization of the driven-side pulley 87 that is supported by the axle input shaft 310 thanks to the provision of the speed-reduction gear train 550.

Furthermore, the HST unit 100G makes it possible to reduce the capacity of the brake mechanism 250 to be needed since the brake mechanism 250 is positioned on an upper side of the speed-reduction gear train 550 in the power transmission direction, thereby miniaturizing the brake mechanism 250.

This specification is by no means intended to restrict the present invention to the preferred embodiments set forth therein. Various modifications from the working vehicle and the HST unit may be made by those skilled in the art without departing from the spirit and scope of the present invention as defined in the appended claims.

What is claimed is:

1. A working vehicle comprising a vehicle frame, a driving power source supported by the vehicle frame, a pair of left and right first and second main driving wheels positioned on a rear side in a vehicle lengthwise direction, a hydrostatic transmission ("HST"), formed by a hydraulic pump main body which is operatively driven by the driving power source and a hydraulic motor main body which is fluidly connected to the hydraulic pump main body through a pair of first and second HST lines, and a differential gear device differentially outputting rotational power from the HST to the pair of main driving wheels, the working vehicle further comprising:

an axle unit including the differential gear device, an axle case that accommodates the differential gear device, an axle input shaft that is supported by the axle case in a state where its first end extends outward from the axle case so as to input rotational power from the HST, and first and second main output shafts that are differentially driven to each other by the differential gear device and output rotational power toward the first and second main driving wheels;

an HST unit including the hydraulic pump main body, the hydraulic motor main body, a capacity adjustment mechanism that changes a capacity of at least one of the hydraulic pump main body and the hydraulic motor main body, an HST case that that support the hydraulic pump main body and the hydraulic motor main body, respectively, in a relatively non-rotatable manner with respect thereto, an HST input shaft that is supported by the HST case in a state capable of being operatively coupled to the driving power source, and an HST output shaft that is supported by the HST case in a state where at least its first end is extended outward from the HST case so as to output rotational power of the hydraulic motor main body to the outside, wherein:

the axle unit is directly or indirectly supported by the vehicle frame so as to be positioned close to the first main driving wheel on a first side in a vehicle width direction in a state where the axle unit is directly or indirectly supported by the vehicle frame, the axle input shaft is supported by the axle case in a rotatable manner around an axis line while extending along the vehicle width direction and having an end extended outward from the axle case, the end being positioned on an opposite side in the vehicle width direction with respect to the first side on which the first main driving wheel is positioned, the HST unit is directly or indirectly supported by the vehicle frame so as to be positioned forward of and away from the axle unit in a state where the HST output shaft extends in the vehicle widthwise direction, the HST output shaft is supported by the HST case in a rotatable manner around an axis line while having an end extended outward from the HST case, the end being closer to the first side in the vehicle width direction on which the first main driving wheel is positioned, the HST output shaft and the axle input shaft are operatively connected to each other through an endless type transmission member, the first and second main output shafts are positioned downward of the axle input shaft, the first main output shaft has an end, which is on a side closer to the corresponding first main driving wheel, extended outward from the axle case so as to be operatively connected to the first main driving wheel, and the second main output shaft is operatively connected to the second main driving wheel through a transmission shaft along the vehicle width direction so as to have a free space between the first and second main driving wheels and above the transmission shaft.

2. A working vehicle according to claim 1, further comprising a brake mechanism capable of selectively applying a braking force to a traveling system power transmission path extending from the driving power source to the pair of main driving wheels, wherein the brake mechanism is provided at the HST unit so as to operatively apply the braking force to the motor shaft.

3. A working vehicle according to claim 1, wherein the pump shaft has a first end that is extended outward from the HST case so that the pump shaft functions as the HST input shaft and a second end on an opposite from the first end that is also extended outward from the HST case, the HST unit is mounted at the working vehicle so that the pump shaft extends in a vertical direction, and a cooling fan is supported on the second end of the pump shaft in a relatively non-rotatable manner with respect thereto.

4. A working vehicle according to claim 1, wherein the HST unit includes an auxiliary pump main body rotated and driven by the pump shaft with using fluid stored in the HST case as a fluid source, and a filter that filters fluid of the stored fluid that is suctioned by the auxiliary pump main body, and the filter is accommodated in the HST case in such a manner that at least a part thereof is positioned in a lower region of the internal space of the HST case.

5. A working vehicle according to claim 1, wherein the HST unit further includes a reservoir tank fluidly connected to the internal space of the HST case through a communication port provided in the HST case, the communication port opens, to the outside, a portion of the internal space of the HST case that is positioned uppermost in a state where the HST unit is mounted at the working vehicle, and the reservoir tank is placed so that its storage space is positioned above the internal space of the HST case.

6. A working vehicle according to claim 1, wherein
the differential gear device includes a ring gear operatively coupled to the axle input shaft, first and second side bevel gears supported by the first and second output shafts, respectively, in a relatively non-rotatable manner with respect thereto, a pinion shaft rotating together with the ring gear, and a bevel pinion supported by the pinion shaft in a relatively rotatable manner with respect thereto in a state of being engaged with the first and second side bevel gears,
the first output shaft functions as a first driving axle connected to a first wheel to which the first main driving wheel is mounted, and
the second output shaft is connected through a transmission shaft along a vehicle widthwise direction to a second driving axle connected to a second wheel, to which the second main driving wheel is mounted, in a relatively non-rotatable manner around the axis line with respect thereto.

7. A working vehicle according to claim 6, wherein
the first wheel includes a disk portion to which the first output shaft is coupled, and a rim portion that extends in the rotational axis line of the first wheel from an outer end of the disk portion in a radial direction, and
an outer portion of the axle case in the vehicle widthwise direction is inserted into the rim portion so that the ring gear is positioned within the rim portion.

8. A working vehicle according to claim 6, wherein the axle unit includes a speed-reduction gear train that transmits rotational power of the axle input shaft to the ring gear while reducing the rotational speed thereof.

9. A hydrostatic transmission ("HST") unit comprising a pump shaft operatively connected to a driving power source, a hydraulic pump main body supported by the pump shaft in a relatively non-rotatable manner with respect thereto, a hydraulic motor main body fluidly connected through a pair of first and second HST lines to the hydraulic pump main body to form a closed circuit, a motor shaft supporting the hydraulic motor main body in a relatively non-rotatable manner with respect thereto, a capacity adjustment mechanism changing a capacity of at least one of the hydraulic pump main body and the hydraulic motor main body, and a HST case accommodating the hydraulic pump main body, the hydraulic motor main body and the capacity adjustment mechanism in a liquid tight manner, wherein the HST unit directly or indirectly outputs rotational power of the motor shaft, the HST unit further comprising:
a first HST fluid channel forming a part of the first HST line; and
a second HST fluid channel forming a part of the second HST line, wherein:
the first HST fluid channel includes a pump-side first HST fluid channel that has a first end fluidly connected to the hydraulic pump main body, and a motor-side first HST fluid channel that is fluidly disconnected to the pump-side first HST fluid channel and has a first end fluidly connected to the hydraulic motor main body,
the second HST fluid channel has a pump-side end fluidly connected to the hydraulic pump main body and a motor-side end fluidly connected to the hydraulic motor main body, and
the HST case is provided with a pump-side hydraulic fluid port and a motor-side hydraulic fluid port through which second ends of the pump-side first HST fluid channel and the motor-side first HST fluid channel are opened outward, respectively, so as to easily take out the hydraulic fluid that the hydraulic pump main body has discharged for driving the hydraulic motor main body.

10. An HST unit according to claim 9, further comprising an auxiliary pump main body driven by the pump shaft, a suction fluid channel having a first end opened in the HST case and a second end fluidly connected to a suction side of the auxiliary pump main body, a discharge fluid channel having a first end fluidly connected to a discharge side of the auxiliary pump main body, an HST charge fluid channel having a first end fluidly connected in a direct or indirect manner to the discharge fluid channel and a second end fluidly connected through a check valve to at least one of the pair of HST fluid channels, and a hydraulic-fluid extraction fluid channel having a first end fluidly connected to the discharge fluid channel, wherein
the HST case is provided with a hydraulic-fluid extraction port for extracting hydraulic fluid in the hydraulic-fluid extraction fluid channel to the outside.

11. An HST unit according to claim 10, further comprising a charge relief valve for setting hydraulic pressure of the HST charge fluid channel.

12. An HST unit according to claim 10, wherein the HST case is provided with a hydraulic-fluid return port for introducing fluid, which has been returned from the outside, into the HST charge fluid channel.

13. An HST unit according to claim 10, further comprising a hydraulic-fluid pressure setting fluid channel that has a first end fluidly connected to the discharge fluid channel or the hydraulic-fluid extraction fluid channel, and a hydraulic-fluid relief valve that is inserted in the hydraulic-fluid pressure setting fluid channel so as to have a primary side fluidly connected to the discharge fluid channel or the hydraulic-fluid pressure extraction fluid channel.

14. An HST unit according to claim 13, wherein a secondary side of the hydraulic-fluid relief valve is fluidly connected to the HST charge fluid channel.

\* \* \* \* \*